United States Patent
Chen et al.

(10) Patent No.: US 10,250,371 B2
(45) Date of Patent: Apr. 2, 2019

(54) DMRS SIGNAL TRANSMISSION METHOD AND APPARATUS

(71) Applicant: Huawei Technologies Co., Ltd., Shenzhen (CN)

(72) Inventors: Dageng Chen, Shanghai (CN); Yong Liu, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 15/197,170

(22) Filed: Jun. 29, 2016

(65) Prior Publication Data

US 2016/0315748 A1 Oct. 27, 2016

Related U.S. Application Data

(63) Continuation of application No. PCT/CN2014/083452, filed on Jul. 31, 2014.

(30) Foreign Application Priority Data

Dec. 30, 2013 (CN) .......................... 2013 1 0749497

(51) Int. Cl.
*H04L 5/00* (2006.01)
*H04W 52/02* (2009.01)
(Continued)

(52) U.S. Cl.
CPC ....... *H04L 5/0051* (2013.01); *H04W 52/0203* (2013.01); *H04W 52/04* (2013.01);
(Continued)

(58) Field of Classification Search
None
See application file for complete search history.

(56) References Cited

U.S. PATENT DOCUMENTS

2011/0201376 A1* 8/2011 Hu ....................... H04B 7/0426
455/522
2011/0292826 A1* 12/2011 Ahn ...................... H04W 52/16
370/252

(Continued)

FOREIGN PATENT DOCUMENTS

CN 101316254 A 12/2008
CN 101841845 A 9/2010
(Continued)

OTHER PUBLICATIONS

Sesia et al., "LTE-The UMTS Long Term Evolution; From Theory to Practice; Second Edition," pp. i-752, John Wiley & Sons, West Sussex, United Kingdom (2011).
(Continued)

*Primary Examiner* — Robert C Scheibel
(74) *Attorney, Agent, or Firm* — Leydig, Voit & Mayer, Ltd.

(57) ABSTRACT

Embodiments of the present invention relate to the communications field, and provide a signal transmission method and apparatus, which can effectively resolve a resource waste problem of user data resource elements and improve system power utilization. The method includes: determining, by a base station, a first parameter value of a user data resource element RE, an initial parameter value of a demodulation reference signal resource element DMRS RE, and a compensation parameter value of the DMRS RE; determining, by the base station according to the initial parameter value and the compensation parameter value, a second parameter value required for transmitting a DMRS; and transmitting, by the base station, the DMRS, the user data, and the compensation parameter value to user equipment, so that the user equipment demodulates the user data.

20 Claims, 16 Drawing Sheets

A base station determines a first parameter value of a user data resource element RE, an initial parameter value of a demodulation reference signal resource element DMRS RE, and a compensation parameter value of the DMRS RE — S101

The base station determines, according to the initial parameter value and the compensation parameter value, a second parameter value required for transmitting a DMRS — S102

The base station transmits the DMRS, user data, and the compensation parameter value of the DMRS RE to user equipment — S103

(51) Int. Cl.
*H04W 52/32* (2009.01)
*H04W 52/04* (2009.01)
*H04W 72/04* (2009.01)
*H04W 88/02* (2009.01)
*H04W 88/08* (2009.01)

(52) U.S. Cl.
CPC ....... *H04W 52/325* (2013.01); *H04W 72/042* (2013.01); *H04W 72/0473* (2013.01); *H04W 88/02* (2013.01); *H04W 88/08* (2013.01); *Y02D 70/1262* (2018.01)

(56) References Cited

U.S. PATENT DOCUMENTS

| | | | |
|---|---|---|---|
| 2012/0207119 A1* | 8/2012 | Zhang | H04L 5/0023 370/329 |
| 2013/0188577 A1* | 7/2013 | Papasakellariou | H04W 72/04 370/329 |
| 2014/0119322 A1* | 5/2014 | Wang | H04W 72/04 370/329 |
| 2014/0254421 A1* | 9/2014 | Ahlander | H04L 25/0224 370/252 |
| 2015/0043466 A1* | 2/2015 | Yoshida | H04W 16/28 370/329 |
| 2015/0049704 A1 | 2/2015 | Park et al. | |
| 2017/0245251 A1* | 8/2017 | Kim | H04W 72/042 |
| 2017/0311313 A1* | 10/2017 | Park | H04L 5/005 |

FOREIGN PATENT DOCUMENTS

| | | |
|---|---|---|
| CN | 101888690 A | 11/2010 |
| CN | 101998596 A | 3/2011 |
| CN | 102006603 A | 4/2011 |
| CN | 103326811 A | 9/2013 |
| WO | WO 2011100857 A9 | 8/2011 |
| WO | 2013131397 A1 | 9/2013 |
| WO | WO 2013172670 A1 | 11/2013 |

OTHER PUBLICATIONS

Agarwal et al., "Pilot Based Channel Estimation for 3GPP LTE Downlink," (Dec. 2011).

"3$^{rd}$ Generation Partnership Project; Technical Specification Group Radio Access Network; Evolved Universal Terrestrial Radio Access (E-UTRA); Physical Channels and Modulation (Release 8)," 3GPP TS 36.211, V8.1.0, pp. 1-54, 3$^{rd}$ Generation Partnership Project, Valbonne, France (Nov. 2007).

"3rd Generation Partnership Project; Technical Specification Group Radio Access Network; Study on Provision of Low-cost Machine-Type Communications (MTC) User Equipments (UEs) based on LTE (Release 12)," 3GPP TR 36.888 V12.0.0. pp. 1-55, 3rd Generation Partnership Project, Valbonne, France (Jun. 2013).

* cited by examiner

DMRS SIGNAL TRANSMISSION METHOD AND APPARATUS

CROSS-REFERENCE TO RELATED APPLICATIONS

This application is a continuation of International Application No. PCT/CN2014/083452, filed on Jul. 31, 2014, which claims priority to Chinese Patent Application No. 201310749497.2, filed on Dec. 30, 2013, both of which are hereby incorporated by reference in their entireties.

TECHNICAL FIELD

The present invention relates to the communications field, and in particular, to a signal transmission method and apparatus.

BACKGROUND

With fast development of communications technologies, a high speed, a large capacity, and wide coverage have become main characteristics of a modern communications system. Communication ranges are expanded continuously, and communication environments are increasingly complex and diversified, resulting in severe fading, intersymbol interference, and the like. It is particularly important to resolve such non-ideal feature problems.

A multiple-input multiple-output (MIMO) technology, by using resources in a space dimension, allows a signal to obtain an array gain, a multiplexing gain, a diversity gain, and an interference cancellation gain in space, and exponentially increases a capacity and spectral efficiency of the communications system without increasing system bandwidth.

As communication requirements of people on high precision, high reliability, high flexibility, and the like are continuously higher, the modern communications system is always faced with a greater challenge for a larger capacity, wider coverage, and higher speed. One of key technologies and effective means to resolve this problem is to use a transceiver having more antennas, namely, a High Dimensional MIMO (HD-MIMO) system. The HD-MIMO technology can increase the system capacity greatly, and when service requirements (transmission rate, bit error rate, and the like) are low, can reduce a transmit power.

In the prior art, because a quantity of antennas in a conventional MIMO communication scenario is relatively small, and demodulation performance of user data based on an antenna array gain is not improved obviously, only a same power is allocated to a demodulation reference signal resource element (DMRS RE) and a user data RE. In addition, to improve channel estimation performance, in R8, a power of an RE in which a Cell-specific Reference Signal (CRS) is located is increased by using a power of an adjacent user data RE. A premise for implementing this is that a total power of the resource blocks does not change, that is, a power increment on the CRS RE is equal to a power decrement on the other user data.

However, in an HD-MIMO scenario, a high-dimensional antenna configuration provides a capability of sharply reducing a transmit power, and powers of both a user data RE and a DMRS RE are reduced greatly. When an antenna quantity is very large, user data can obtain an array gain of high-dimensional transmit and receive antennas, and an SINR point at which the user data works may be very low; however, a DMRS cannot obtain an array gain of the high-dimensional transmit and receive antennas, and therefore can work only in a region in which an SINR is relatively high. To ensure accuracy of channel estimation at a receive end, a same power is allocated to a DMRS RE and a user data RE, but the power of the user data RE is wasted greatly, and the system cannot fully explore the capability of power reduction, and power utilization is low.

SUMMARY

Embodiments of the present invention provide a signal transmission method and apparatus, which can ensure accuracy of channel estimation at a receive end, effectively resolve a resource waste problem of user data resource elements, and improve system power utilization.

To achieve the foregoing objective, the following technical solutions are adopted in the embodiments of the present invention:

According to a first aspect, an embodiment of the present invention provides a signal transmission method, including:

determining, by a base station, a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS;

determining, by the base station according to the initial parameter value and the compensation parameter value, a second parameter value required for transmitting the DMRS; and transmitting, by the base station, the DMRS, the user data, and the compensation parameter value to user equipment, so that the user equipment obtains, according to the compensation parameter value and a preset initial parameter value, the DMRS transmitted by the base station by using the second parameter value, and the user equipment obtains a DMRS RE channel estimation value according to the received DMRS and the DMRS transmitted by using the second parameter value, and the user equipment performs interpolation filtering on the DMRS RE channel estimation value to obtain channel information of the user data RE, and further the user equipment demodulates the user data according to the channel information of the user data RE.

In a first possible implementation manner of the first aspect, the determining, by a base station, a first parameter value of a user data resource element RE, an initial parameter value of a demodulation reference signal resource element DMRS RE, and a compensation parameter value of the DMRS RE, specifically includes:

determining, by the base station, the first parameter value of the user data RE, the initial parameter value of the DMRS RE, and the compensation parameter value of the DMRS RE according to network configuration information of the base station, where the network configuration information includes one or more of a quantity of transmit and receive antennas, a transmission order, or a channel estimation algorithm of the user equipment, the DMRS RE is used to carry a demodulation reference signal DMRS, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

In a second possible implementation manner of the first aspect, the transmitting, by the base station, the DMRS and the user data to user equipment, specifically includes:

processing, by the base station, the user data and the DMRS in a same precoding processing manner; and transmitting, by the base station, the processed user data and DMRS to the user equipment by using a physical downlink shared channel PDSCH or an enhanced physical downlink control channel EPDCCH.

According to a second aspect, an embodiment of the present invention further provides a signal transmission method, including:

acquiring, by user equipment, a compensation parameter value of a demodulation reference signal resource element DMRS RE, user data, and a demodulation reference signal DMRS, where the DMRS RE is used to carry the demodulation reference signal DMRS;

obtaining, by the user equipment according to the compensation parameter value and a preset initial parameter value, the DMRS transmitted by a base station by using a second parameter value, where the second parameter value is a parameter value that is required for transmitting the DMRS and determined by the base station according to an initial parameter value of the DMRS RE and the compensation parameter value;

obtaining, by the user equipment, a DMRS RE channel estimation value according to the received DMRS and the DMRS transmitted by using the second parameter value;

performing, by the user equipment, interpolation filtering on the DMRS RE channel according to the DMRS RE channel estimation value to obtain channel information of a user data resource element RE, where the user data RE is used to carry the user data; and demodulating, by the user equipment, the user data according to the channel information of the user data RE.

In a first possible implementation manner of the second aspect, the acquiring, by user equipment, a compensation parameter value of a demodulation reference signal resource element DMRS RE, user data, and a demodulation reference signal DMRS, includes:

the compensation parameter value acquired by the user equipment is the compensation parameter value of the DMRS RE that is transmitted by the base station and received by the user equipment, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the user data acquired by the user equipment is the user data that is transmitted by the base station by using a first parameter value of the user data resource element RE and received by the user equipment, where the user data RE is used to carry the user data, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the DMRS acquired by the user equipment is the DMRS that is transmitted by the base station by using the second parameter value and received by the user equipment, where the second parameter value is the parameter value that is required for transmitting the DMRS and determined by the base station according to the initial parameter value of the DMRS RE and the compensation parameter value of the DMRS RE, and the second parameter value includes a second power value or a second amplitude value.

With reference to the first possible implementation manner of the second aspect, in a second possible implementation manner of the second aspect, the acquiring, by the user equipment, user data and a demodulation reference signal DMRS, specifically includes:

receiving, by the user equipment, the user data and the DMRS from the base station by using a PDSCH or an EPDCCH, where the user data and the DMRS are transmitted by the base station after being processed in a same precoding processing manner.

According to a third aspect, an embodiment of the present invention further provides a signal transmission method, including:

determining, by a base station, a first parameter value of a user data resource element RE, an initial parameter value of a demodulation reference signal resource element DMRS RE, and a compensation parameter value of the DMRS RE, where the user data RE is used to carry user data, the first parameter value is used to indicate that the user equipment transmits the user data by using the first parameter value, and the DMRS RE is used to carry a demodulation reference signal DMRS;

transmitting, by the base station, the compensation parameter value to the user equipment, so that the user equipment determines, according to the compensation parameter value and a preset initial parameter value, a second parameter value required for transmitting the DMRS;

receiving, by the base station, the user data and the DMRS transmitted by the user equipment;

obtaining, by the base station according to the compensation parameter value and the initial parameter value, the DMRS transmitted by the user equipment by using the second parameter value;

obtaining, by the base station, a DMRS RE channel estimation value according to the received DMRS and the DMRS transmitted by using the second parameter value;

performing, by the base station, interpolation filtering on the DMRS RE channel according to the DMRS RE channel estimation value to obtain channel information of the user data RE; and demodulating, by the base station, the user data according to the channel information of the user data.

In a first possible implementation manner of the third aspect, the determining, by a base station, a first parameter value of a user data resource element RE, an initial parameter value of a demodulation reference signal resource element DMRS RE, and a compensation parameter value of the DMRS RE, specifically includes:

determining, by the base station, the first parameter value of the user data RE, the initial parameter value of the demodulation reference signal resource element DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

With reference to the first possible implementation manner of the third aspect, in a second possible implementation manner of the third aspect, the receiving, by the base station, the user data and the DMRS transmitted by the user equipment, specifically includes:

if the DMRS is transmitted in a physical uplink shared channel PUSCH, receiving, by the base station, the user data and the DMRS from the user equipment by using the PUSCH, where the data and the DMRS are transmitted by the user equipment after being processed in a same precoding processing manner, the DMRS is transmitted by the user equipment by using the second parameter value, and the user data is transmitted by the user equipment by using the first parameter value; and if the DMRS is transmitted in a physical uplink control channel PUCCH, receiving, by the base station, the user data and the DMRS from the user equipment by using the PUCCH, where the user data and the DMRS are transmitted by the user equipment after being processed in a same precoding processing manner, the DMRS is transmitted by the user equipment by using the second parameter value, and the user data is transmitted by the user equipment by using the first parameter value.

According to a fourth aspect, an embodiment of the present invention further provides a signal transmission method, including:

acquiring, by user equipment, a compensation parameter value of a demodulation reference signal resource element DMRS RE, where the DMRS RE is used to carry a demodulation reference signal DMRS;

determining, by the user equipment according to the compensation parameter value and a preset initial parameter value, a second parameter value required for transmitting the DMRS; and transmitting, by the user equipment, user data and the DMRS to a base station, so that the base station obtains a DMRS RE channel estimation value according to the received DMRS and the DMRS that is transmitted by the user equipment by using the second parameter value, and the base station performs interpolation filtering on the DMRS RE channel estimation value to obtain channel information of a user data RE, and further the base station demodulates the user data according to the channel information of the user data RE.

In a first possible implementation manner of the fourth aspect, the acquiring, by user equipment, a compensation parameter value of a DMRS RE, specifically includes:

the compensation parameter value of the DMRS RE acquired by the user equipment is the compensation parameter value of the DMRS RE that is transmitted by the base station and received by the user equipment, where the compensation parameter value of the DMRS RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

In a second possible implementation manner of the fourth aspect, the transmitting, by the user equipment, the DMRS and user data to a base station, specifically includes:

processing, by the user equipment, the user data and the DMRS in a same precoding processing manner;

if the DMRS is transmitted in a physical uplink shared channel PUSCH, transmitting, by the user equipment, the processed user data and DMRS to the base station by using the PUSCH, where the DMRS is transmitted by the user equipment by using the second parameter value, the user data is transmitted by the user equipment by using the first parameter value, the first parameter value includes a first power value, and the second parameter value includes a second power value, or the first parameter value includes a first amplitude value, and the second parameter value includes a second amplitude value; and if the DMRS is transmitted in a physical uplink control channel PUCCH, transmitting, by the user equipment, the processed user data and DMRS to the base station by using the PUCCH, where the DMRS is transmitted by the user equipment by using the second parameter value, the user data is transmitted by the user equipment by using the first parameter value, the first parameter value includes the first power value, and the second parameter value includes the second power value, or the first parameter value includes the first amplitude value, and the second parameter value includes the second amplitude value.

According to a fifth aspect, an embodiment of the present invention further provides a signal transmission method, including:

determining, by a base station, a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits the DMRS by using the first parameter value, and the DMRS RE is used to carry the demodulation reference signal DMRS;

determining, by the base station according to the initial parameter value and the compensation parameter value, a second parameter value required for transmitting the user data; and transmitting, by the base station, the DMRS, the user data, and the compensation parameter value to user equipment, so that the user equipment computes, according to the compensation parameter value and a preset initial parameter value, the user data transmitted by the base station by using the second parameter value, and the user equipment obtains a DMRS RE channel estimation value according to the received DMRS, and that the user equipment performs interpolation filtering on the DMRS RE channel estimation value to obtain channel information of the user data RE, and further the user equipment demodulates the user data according to the channel information of the user data RE and the user data transmitted by using the second parameter value.

In a first possible implementation manner of the fifth aspect, the determining, by a base station, a first parameter value of a demodulation reference signal resource element DMRS RE, an initial parameter value of a user data resource element RE, and a compensation parameter value of the user data RE, specifically includes:

determining, by the base station, the first parameter value of the demodulation reference signal resource element DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

In a second possible implementation manner of the fifth aspect, the transmitting, by the base station, the DMRS and the user data to user equipment, specifically includes:

processing, by the base station, the user data and the DMRS in a same precoding processing manner; and transmitting, by the base station, the processed user data and DMRS to the user equipment by using a physical downlink shared channel PDSCH or an enhanced physical downlink control channel EPDCCH.

According to a sixth aspect, an embodiment of the present invention further provides a signal transmission method, including:

acquiring, by user equipment, a demodulation reference signal DMRS, user data, and a compensation parameter value of a user data resource element RE, where the user data RE is used to carry the user data;

obtaining, by the user equipment according to the compensation parameter value and a preset initial parameter value, the user data transmitted by a base station by using a second parameter value, where the second parameter value is a parameter value that is required for transmitting the user data and determined by the base station according to an initial parameter value of the user data RE and the compensation parameter value;

obtaining, by the user equipment, a DMRS RE channel estimation value according to the received DMRS;

performing, by the user equipment, interpolation filtering on the DMRS RE channel according to the DMRS RE channel estimation value to obtain channel information of the user data RE; and demodulating, by the user equipment, the user data according to the channel information of the user data RE and the user data transmitted by using the second parameter value.

In a first possible implementation manner of the sixth aspect, the acquiring, by user equipment, a demodulation reference signal DMRS, user data, and a compensation parameter value of a user data resource element RE, specifically includes:

the compensation parameter value acquired by the user equipment is the compensation parameter value of the user data RE that is transmitted by the base station and received by the user equipment, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the DMRS acquired by the user equipment is the DMRS that is transmitted by the base station by using a first parameter value of a demodulation reference signal resource element DMRS RE and received by the user equipment, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the user equipment is the user data that is transmitted by the base station by using the second parameter value and received by the user equipment, where the second parameter value is the parameter value that is required for transmitting the user data and determined by the base station according to the initial parameter value of the user data RE and the compensation parameter value of the user data RE, and the second parameter value includes a second power value or a second amplitude value.

With reference to the first possible implementation manner of the sixth aspect, in a second possible implementation manner of the sixth aspect, the user equipment receives the user data and the DMRS from the base station by using a PDSCH or an EPDCCH, where the user data and the DMRS are transmitted by the base station after being processed in a same precoding processing manner.

According to a seventh aspect, an embodiment of the present invention further provides a signal transmission method, including:

determining, by a base station, a first parameter value of a demodulation reference signal resource element DMRS RE, an initial parameter value of a user data resource element RE, and a compensation parameter value of the user data RE, where the user data RE is used to carry user data, the first parameter value is used to indicate that the user equipment transmits the DMRS by using the first parameter value, and the DMRS RE is used to carry the demodulation reference signal DMRS;

transmitting, by the base station, the compensation parameter value to the user equipment, so that the user equipment determines, according to the compensation parameter value and a preset initial parameter value, a second parameter value required for transmitting the user data;

receiving, by the base station, the user data and the DMRS transmitted by the user equipment;

computing, by the base station according to the compensation parameter value and the initial parameter value, the user data transmitted by the user equipment by using the second parameter value;

obtaining, by the base station, a DMRS RE channel estimation value according to the received DMRS;

performing, by the base station, interpolation filtering on the DMRS RE channel according to the DMRS RE channel estimation value to obtain channel information of the user data RE; and demodulating, by the base station, the user data according to the channel information of the user data RE and the computed user data transmitted by the user equipment by using the second parameter value.

In a first possible implementation manner of the seventh aspect, the determining, by a base station, a first parameter value of a demodulation reference signal resource element DMRS RE, an initial parameter value of a user data resource element RE, and a compensation parameter value of the user data RE, specifically includes:

determining, by the base station, the first parameter value of the DMRS RE, the initial parameter value of the user data RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

With reference to the first possible implementation manner of the seventh aspect, in a second possible implementation manner of the seventh aspect, the receiving, by the base station, the user data and the DMRS transmitted by the user equipment, specifically includes:

if the DMRS is transmitted in a physical uplink shared channel PUSCH, receiving, by the base station, the user data and the DMRS from the user equipment by using the PUSCH, where the user data and the DMRS are transmitted by the user equipment after being processed in a same precoding processing manner, the user data is transmitted by the user equipment by using the second parameter value, and the DMRS is transmitted by the user equipment by using the first parameter value; and if the DMRS is transmitted in a physical uplink control channel PUCCH, receiving, by the base station, the user data and the DMRS from the user equipment by using the PUCCH, where the user data and the DMRS are transmitted by the user equipment after being processed in a same precoding processing manner, the user data is transmitted by the user equipment by using the second parameter value, and the DMRS is transmitted by the user equipment by using the first parameter value.

According to an eighth aspect, an embodiment of the present invention further provides a signal transmission method, including:

acquiring, by user equipment, a compensation parameter value of a user data resource element RE, where the user data RE is used to carry user data;

determining, by the user equipment according to the compensation parameter value and a preset initial parameter value, a second parameter value required for transmitting the user data; and transmitting, by the user equipment, the user data and a DMRS to a base station, so that the base station obtains a DMRS RE channel estimation value according to the received DMRS, and the base station performs interpolation filtering on the DMRS RE channel according to the DMRS RE channel estimation value to obtain channel information of the user data RE, and further the base station demodulates the user data according to the channel information of the user data RE and the user data that is transmitted by the user equipment by using the second parameter value and computed by the base station according to the compensation parameter value and an initial parameter value of the user data RE.

In a first possible implementation manner of the eighth aspect, the acquiring, by user equipment, a compensation parameter value of a user data RE, specifically includes:

the compensation parameter value of the user data RE acquired by the user equipment is the compensation parameter value of the user data RE that is transmitted by the base station and received by the user equipment, where the compensation parameter value of the user data RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

In a second possible implementation manner of the eighth aspect, the transmitting, by the user equipment, the DMRS and user data to a base station, specifically includes:

processing, by the user equipment, the user data and the DMRS in a same precoding processing manner;

if the DMRS is transmitted in a physical uplink shared channel PUSCH, transmitting, by the user equipment, the processed user data and DMRS to the base station by using the PUSCH, where the DMRS is transmitted by the user equipment by using a first parameter value, the user data is transmitted by the user equipment by using the second parameter value, the first parameter value includes a first power value, and the second parameter value includes a second power value, or the first parameter value includes a first amplitude value, and the second parameter value includes a second amplitude value; and if the DMRS is transmitted in a physical uplink control channel PUCCH, transmitting, by the user equipment, the processed user data and DMRS to the base station by using the PUCCH, where the DMRS is transmitted by the user equipment by using the first parameter value, the user data is transmitted by the user equipment by using the second parameter value, the first parameter value includes the first power value, and the second parameter value includes the second power value, or the first parameter value includes the first amplitude value, and the second parameter value includes the second amplitude value.

According to a ninth aspect, an embodiment of the present invention provides a base station, including:

a determining unit, configured to determine a first parameter value of a user data resource element RE, an initial parameter value of a demodulation reference signal resource element DMRS RE, and a compensation parameter value of the DMRS RE, and configured to determine, according to the initial parameter value and the compensation parameter value, a second parameter value required for transmitting the DMRS, where the user data RE is used to carry user data, the first parameter value is used to indicate that the base station transmits the user data by using the first parameter value, and the DMRS RE is used to carry the demodulation reference signal DMRS; and a transmitting unit, configured to transmit the DMRS, the user data, and the compensation parameter value to user equipment, so that the user equipment computes, according to the compensation parameter value and a preset initial parameter value, the DMRS transmitted by the base station by using the second parameter value, and the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE.

In a first possible implementation manner of the ninth aspect, the determining unit is configured to determine the first parameter value of the user data RE, the initial parameter value of the DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

In a second possible implementation manner of the ninth aspect, the transmission unit includes a processing module, where:

the processing module is configured to process the user data and the DMRS in a same precoding processing manner, and add the compensation parameter value of the DMRS RE to explicit signaling or higher layer signaling.

With reference to the second possible implementation manner of the ninth aspect, in a third possible implementation manner of the ninth aspect, the transmission unit transmits the processed user data and DMRS to the user equipment by using a physical downlink shared channel PDSCH or an enhanced physical downlink control channel EPDCCH, and transmits the compensation parameter value of the DMRS RE to the user equipment by using a physical downlink control channel PDCCH or a physical broadcast channel PBCH.

According to a tenth aspect, an embodiment of the present invention provides user equipment, including:

an acquiring unit, configured to acquire a compensation parameter value of a demodulation reference signal resource element DMRS RE, user data, and a demodulation reference signal DMRS, where the DMRS RE is used to carry the demodulation reference signal DMRS; and a processing unit, configured to obtain, according to the compensation parameter value and a preset initial parameter value, the DMRS transmitted by a base station by using a second parameter value, obtain a DMRS RE channel estimation value according to the received DMRS and the DMRS transmitted by using the second parameter value, further perform interpolation filtering on the DMRS RE channel according to the DMRS RE channel estimation value to obtain channel information of a user data resource element RE, and finally demodulate the user data according to the channel information of the user data RE, where the second parameter value is a parameter value that is required for transmitting the DMRS and determined by the base station according to an initial parameter value of the DMRS RE and the compensation parameter value.

In a first possible implementation manner of the tenth aspect, the compensation parameter value acquired by the acquiring unit is the received compensation parameter value of the DMRS RE that is transmitted by the base station, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the user data acquired by the acquiring unit is the received user data that is transmitted by the base station by using a first parameter value of the user data resource element RE, where the user data RE is used to carry the user data, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the DMRS acquired by the acquiring unit is the received DMRS that is transmitted by the base station by using the second parameter value, where the second parameter value is the parameter value that is required for transmitting the DMRS and determined by the base station according to the initial parameter value of the DMRS and the compensation parameter value of the DMRS RE, and the second parameter value includes a second power value or a second amplitude value.

With reference to the first possible implementation manner of the tenth aspect, in a second possible implementation manner of the tenth aspect, the acquiring unit receives the user data and the DMRS from the base station by using a PDSCH or an EPDCCH, where the user data and the DMRS are transmitted by the base station after being processed in a same precoding processing manner.

According to an eleventh aspect, an embodiment of the present invention provides a base station, including:

a determining unit, configured to determine a first parameter value of a user data resource element RE, an initial parameter value of a demodulation reference signal resource element DMRS RE, and a compensation parameter value of the DMRS RE, where the user data RE is used to carry user data, the first power value is used to indicate that the user equipment transmits the user data by using the first parameter value, and the DMRS RE is used to carry a demodulation reference signal DMRS;

a transmitting unit, configured to transmit the compensation parameter value to the user equipment, so that the user equipment determines, according to the compensation parameter value and a preset initial parameter value, a second parameter value required for transmitting the DMRS;

a receiving unit, configured to receive the user data and the DMRS transmitted by the user equipment; and a processing unit, configured to compute, according to the compensation parameter value and the initial parameter value, the DMRS transmitted by the user equipment by using the second parameter value, and configured to obtain a DMRS RE channel estimation value according to the received DMRS and the computed DMRS transmitted by the user equipment by using the second parameter value, and further configured to perform interpolation filtering on the DMRS RE channel according to the DMRS RE channel estimation value to obtain channel information of the user data RE, and demodulate the user data according to the channel information of the user data RE.

In a first possible implementation manner of the eleventh aspect, the determining unit is specifically configured to determine the first parameter value of the user data RE, the initial parameter value of the demodulation reference signal resource element DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

With reference to the first possible implementation manner of the eleventh aspect, in a second possible implementation manner of the eleventh aspect, the receiving unit is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the DMRS is transmitted by the user equipment by using the second parameter value, and the user data is transmitted by the user equipment by using the first parameter value; and configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the DMRS is transmitted by the user equipment by using the second parameter value, and the user data is transmitted by the user equipment by using the first parameter value.

According to a twelfth aspect, an embodiment of the present invention provides user equipment, including:

an acquiring unit, configured to acquire a compensation parameter value of a demodulation reference signal resource element DMRS RE, where the DMRS RE is used to carry a demodulation reference signal DMRS;

a determining unit, configured to determine, according to the compensation parameter value acquired by the acquiring unit and a preset initial parameter value, a second parameter value required for transmitting the DMRS; and a transmitting unit, configured to transmit user data and the DMRS to a base station, so that the base station obtains a DMRS RE channel estimation value according to the received DMRS and the DMRS that is transmitted by the user equipment by using the second parameter value, and the base station performs interpolation filtering on the DMRS RE channel estimation value to obtain channel information of a user data RE, and further the base station demodulates the user data according to the channel information of the user data RE.

In a first possible implementation manner of the twelfth aspect, the compensation parameter value of the DMRS RE acquired by the acquiring unit is the received compensation parameter value of the DMRS RE that is transmitted by the base station, where the compensation parameter value of the DMRS RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

In a second possible implementation manner of the twelfth aspect, the transmission unit further includes a processing module, where:

the processing module is configured to process the user data and the DMRS in a same precoding processing manner.

With reference to the second possible implementation manner of the twelfth aspect, in a third possible implementation manner of the twelfth aspect, the transmission unit is specifically configured to transmit, if the DMRS is transmitted in a physical uplink shared channel PUSCH, the processed user data and DMRS to the base station by using the PUSCH, where the DMRS is transmitted by the user equipment by using the second parameter value, the user data is transmitted by the user equipment by using the first parameter value, the first parameter value includes a first power value, and the second parameter value includes a second power value, or the first parameter value includes a first amplitude value, and the second parameter value includes a second amplitude value; and configured to transmit, if the DMRS is transmitted in a physical uplink control channel PUCCH, the processed user data and DMRS to the base station by using the PUCCH, where the DMRS is transmitted by the user equipment by using the second parameter value, the user data is transmitted by the user equipment by using the first parameter value, the first parameter value includes the first power value, and the second parameter value includes the second power value, or the first parameter value includes the first amplitude value, and the second parameter value includes the second amplitude value.

According to a thirteenth aspect, an embodiment of the present invention provides a base station, including:

a determining unit, configured to determine a first parameter value of a demodulation reference signal resource element DMRS RE, an initial parameter value of a user data resource element RE, and a compensation parameter value of the user data RE, and determine, according to the initial parameter value and the compensation parameter value, a second parameter value required for transmitting the user data, where the user data RE is used to carry the user data, the first parameter value is used to indicate that the base station transmits the DMRS by using the first parameter value, and the DMRS RE is used to carry the demodulation reference signal DMRS; and a transmitting unit, configured to transmit the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the user data transmitted by using the second parameter value.

In a first possible implementation manner of the thirteenth aspect, the determining unit determines the first parameter value of the demodulation reference signal resource element DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

With reference to the first possible implementation manner of the thirteenth aspect, in a second possible implementation manner of the thirteenth aspect, the transmission unit further includes a processing module, where:

the processing module is configured to process the user data and the DMRS in a same precoding processing manner; and the transmission unit is specifically configured to transmit the processed user data and DMRS to the user equipment by using a physical downlink shared channel PDSCH or an enhanced physical downlink control channel EPDCCH.

According to a fourteenth aspect, an embodiment of the present invention provides user equipment, including:

an acquiring unit, configured to acquire a demodulation reference signal DMRS, user data, and a compensation parameter value of a user data resource element RE, where the user data RE is used to carry the user data; and a processing unit, configured to obtain, according to the compensation parameter value acquired by the acquiring unit and a preset initial parameter value, the user data transmitted by a base station by using a second parameter value, and obtain a DMRS RE channel estimation value according to the received DMRS, and configured to perform interpolation filtering on the DMRS RE channel according to the DMRS RE channel estimation value to obtain channel information of the user data RE, and further configured to demodulate the user data according to the channel information of the user data RE and the user data transmitted by using the second parameter value, where the second parameter value is a parameter value that is required for transmitting the user data and determined by the base station according to an initial parameter value of the user data RE and the compensation parameter value.

In a first possible implementation manner of the fourteenth aspect, the compensation parameter value acquired by the acquiring unit is the received compensation parameter value of the user data RE that is transmitted by the base station, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the DMRS acquired by the acquiring unit is the received DMRS that is transmitted by the base station by using a first parameter value of a demodulation reference signal resource element DMRS RE, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the acquiring unit is the received user data that is transmitted by the base station by using the second parameter value, where the second parameter value is the parameter value that is required for transmitting the user data and determined by the base station according to the initial parameter value of the user data RE and the compensation parameter value of the user data RE, and the second parameter value includes a second power value or a second amplitude value.

In a second possible implementation manner of the fourteenth aspect, the acquiring unit is specifically configured to receive the user data and the DMRS from the base station by using a PDSCH or an EPDCCH, where the user data and the DMRS are transmitted by the base station after being processed in a same precoding processing manner.

According to a fifteenth aspect, an embodiment of the present invention provides a base station, including:

a determining unit, configured to determine a first parameter value of a demodulation reference signal resource element DMRS RE, an initial parameter value of a user data resource element RE, and a compensation parameter value of the user data RE, where the user data RE is used to carry user data, the first parameter value is used to indicate that the user equipment transmits the DMRS by using the first parameter value, and the DMRS RE is used to carry the demodulation reference signal DMRS;

a transmitting unit, configured to transmit the compensation parameter value to the user equipment, so that the user equipment determines, according to the compensation parameter value and a preset initial parameter value, a second parameter value required for transmitting the user data;

a receiving unit, configured to receive the user data and the DMRS transmitted by the user equipment; and a processing unit, configured to compute, according to the compensation parameter value and the initial parameter value, the user data transmitted by the user equipment by using the second parameter value, and configured to obtain a DMRS RE channel estimation value according to the received DMRS, and further configured to perform interpolation filtering on the DMRS RE channel according to the DMRS RE channel estimation value to obtain channel information of the user data RE, and further configured to demodulate the user data according to the channel information of the user data RE and the computed user data transmitted by the user equipment by using the second parameter value.

In a first possible implementation manner of the fifteenth aspect, the determining unit is specifically configured to determine the first parameter value of the DMRS RE, the initial parameter value of the user data RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

With reference to the first possible implementation manner of the fifteenth aspect, in a second possible implementation manner of the fifteenth aspect, the receiving unit is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the user data is transmitted by the user equipment by using the second parameter value, and the DMRS is transmitted by the user equipment by using the first parameter value; and specifically configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the user data is transmitted by the user equipment by using the second parameter value, and the DMRS is transmitted by the user equipment by using the first parameter value.

According to a sixteenth aspect, an embodiment of the present invention provides user equipment, including:

an acquiring unit, configured to acquire a compensation parameter value of a user data resource element RE, where the user data RE is used to carry user data;

a determining unit, configured to determine, according to the compensation parameter value acquired by the acquiring unit and a preset initial parameter value, a second parameter value required for transmitting the user data; and a transmitting unit, configured to transmit the user data and the DMRS to a base station, so that the base station obtains a DMRS RE channel estimation value according to the received DMRS, and the base station performs interpolation filtering on the DMRS RE channel according to the DMRS RE channel estimation value to obtain channel information of the user data RE, and further the base station demodulates the user data according to the channel information of the user data RE and the user data that is transmitted by the user equipment by using the second parameter value and computed by the base station according to the compensation parameter value and an initial parameter value of the user data RE.

In a first possible implementation manner of the sixteenth aspect, the compensation parameter value of the user data RE acquired by the acquiring unit is the compensation parameter value of the user data RE that is transmitted by the base station and received by the user equipment, where the compensation parameter value of the user data RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

In a second possible implementation manner of the sixteenth aspect, the transmission unit further includes a processing module, where:

the processing module is configured to process the user data and the DMRS in a same precoding processing manner.

With reference to the second possible implementation manner of the sixteenth aspect, in a third possible implementation manner of the sixteenth aspect, the transmission unit is specifically configured to transmit, if the DMRS is transmitted in a physical uplink shared channel PUSCH, the processed user data and DMRS to the base station by using the PUSCH, where the DMRS is transmitted by the user equipment by using a first parameter value, the user data is transmitted by the user equipment by using the second parameter value, the first parameter value includes a first power value, and the second parameter value includes a second power value, or the first parameter value includes a first amplitude value, and the second parameter value includes a second amplitude value; and specifically further configured to transmit, if the DMRS is transmitted in a physical uplink control channel PUCCH, the processed user data and DMRS to the base station by using the PUCCH, where the DMRS is transmitted by the user equipment by using the first parameter value, the user data is transmitted by the user equipment by using the second parameter value, the first parameter value includes the first power value, and the second parameter value includes the second power value, or the first parameter value includes the first amplitude value, and the second parameter value includes the second amplitude value.

The embodiments of the present invention provide a signal transmission method and apparatus. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. This solution can ensure accuracy of channel estimation at a receive end, effectively resolve a resource waste problem of user data resource elements, and improve system power utilization.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
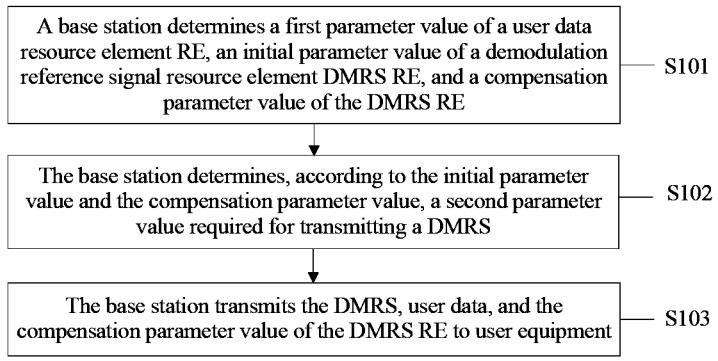
FIG. 1 is a schematic flowchart 1 of a transmission method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In a demodulation process at a receive end of a communications system, compared with incoherent demodulation, coherent demodulation has better performance and has an advantage of about 3 dB. Therefore, coherent demodulation is more widely used in a modern communications system. However, in an OFDM (Orthogonal Frequency-Division Multiplexing) system, modulation of each carrier is carrier suppression, and a reference signal is required for coherent demodulation at a receive end, and is also referred to as a pilot signal or a reference signal (RS). Such reference signals are distributed on different REs (Resource Element) in time-frequency two-dimensional space in an OFDM symbol and have known amplitudes and phases. Likewise, in a MIMO system, each transmit antenna (virtual antenna or physical antenna) has an independent user data channel A receiver performs channel estimation for each transmit antenna, and restores transmitted user data based on this.

Channel estimation is to reestablish a signal receiving process to compensate for channel fading and noise. In channel estimation, an RS pre-known by a transmitter and a receiver is used to track time-domain and frequency-domain changes of a channel. For example, to implement channel quality measurement and user data demodulation in a high-order multi-antenna system, an LTE-A system defines multiple pilot symbols respectively: a Cell-specific reference signals (CRS), a demodulation reference signal (DMRS), and a Channel State Information Reference Signal (CSI-RS), where the DMRS is used for demodulation of a physical downlink shared channel (PDSCH). The CSI-RS is used to report information such as a channel quality indicator (CQI), a precoding matrix indicator (PMI), and a rank indicator (RI). The CRS is used to measure downlink channel quality to perform resource scheduling and support a link adaptation technology, and therefore must be transmitted on all available frequency bands and all subframes and antenna ports.

A same preprocessing manner is used for the DMRS and user data, and features of the DMRS and user data are: (1) UE-specific, that is, a same precoding matrix is used for data of each terminal and a demodulation reference signal corresponding to the data of the terminal. (2) From a perspective of a network side, DMRSs transmitted at various layers are mutually orthogonal. (3) The DMRS is generally used to support beamforming and precoding technologies, and therefore is transmitted on only a scheduled resource block, where a quantity of transmitted DMRSs is proportional to a quantity of user data flows instead of a quantity of transmit antennas.

Embodiment 1

The embodiment of the present invention provides a signal transmission method, as shown in FIG. 1, where the method includes:

S101. A base station determines a first parameter value of a user data resource element RE, an initial parameter value of a demodulation reference signal resource element DMRS RE, and a compensation parameter value of the DMRS RE.

The user data RE is used to carry user data, the first parameter value is used to indicate that the base station transmits the user data by using the first parameter value, and the DMRS RE is used to carry a demodulation reference signal DMRS.

Optionally, the initial parameter value may be an initial power value or may be an initial amplitude value; the compensation parameter value may be a power compensation value or may be an amplitude compensation value; the first parameter value may be a first power value or may be a first amplitude value.

In a MIMO system, an array gain brought by multiple antennas improves a demodulation effect of user data, but a DMRS cannot obtain an array gain of an HD-MIMO system during demodulation. It is assumed that, there is a point-to-point communications model with one transmit antenna and two receive antennas, $S_{DMRS}$ represents a transmitted DMRS signal, $S_{data}$ represents transmitted user data, $h_1$ and $h_2$ respectively represent independent channels from a transmit end to a first antenna and a second antenna of a receive end, $y_1$ and $y_2$ respectively represent DMRS signals received by the two receive antennas, $y_{1\text{-}data}$ and $y_{2\text{-}data}$ respectively represent received signals after the user data passes through the two channels, and $n_1$ and $n_2$ respectively represent noise superimposed on the two channels Therefore, $$y_1 = h_1 S_{DMRS} + n_1;$$

$$y_2 = h_2 S_{DMRS} + n.$$

A channel estimation value obtained by using a Least Square (LS) estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

User data detected by a receiver is:

$$Y_{data} = \begin{bmatrix} y_{1\_data} \\ y_{2\_data} \end{bmatrix} = \begin{bmatrix} h_1 s_{data} + n_1 \\ h_2 s_{data} + n_2 \end{bmatrix}.$$

A user data estimation value is:

$$\hat{s}_{data} = \hat{h}^H Y_{data} = |h_1|^2 + |h_2|^2 + (h_1 n_1 + h_2 n_2).$$

As can be known from the foregoing formula, a signal-to-noise ratio (SNR) gain achieved by the multiple antennas for the user data is not brought to channel estimation during demodulation, that is, $$SNR(\hat{s}_{data}) = (|h_1|^2 + |h_2|^2)\frac{P_s}{N} > SNR(\hat{h}_1).$$

In a high-dimensional antenna configuration system, high-dimensional antennas at a transmit end and a receive end bring a more significant array gain to demodulation of user data, and a signal to interference plus noise ratio (SINR) point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, ensure accuracy of channel estimation at a receive end, effectively resolve a resource waste problem of user data resource elements, and improve system power utilization.

First, the base station determines the first parameter value of the user data resource element RE, the initial parameter value of the demodulation reference signal resource element DMRS RE, and the compensation parameter value of the DMRS RE. The first parameter value of the user data RE is a parameter value used for transmitting the user data by the base station, the initial parameter value of the DMRS RE is a parameter value determined for initially transmitting the DMRS by the base station, the compensation parameter value of the DMRS RE is a compensation parameter value determined for transmitting the DMRS by the base station to ensure accuracy of channel estimation at the receive end.

S102. The base station determines, according to the initial parameter value and the compensation parameter value, a second parameter value required for transmitting a DMRS.

After the base station determines the initial parameter value of the DMRS and the compensation parameter value of the DMRS RE, the base station determines, according to the initial parameter value and the compensation parameter value, the second parameter value required for transmitting the DMRS.

It may be understood that the second parameter value is a parameter value used for actually transmitting the DMRS by the base station.

Optionally, the initial parameter value may be an initial power value or may be an initial amplitude value;

the compensation parameter value may be a power compensation value or may be an amplitude compensation value; the second parameter value may be a second power value or may be a second amplitude value.

S103. The base station transmits the DMRS, user data, and the compensation parameter value of the DMRS RE to user equipment.

After determining the second parameter value for transmitting the DMRS, the base station transmits the DMRS, the user data, and the compensation parameter value of the DMRS RE to the user equipment, so that the user equipment computes, according to the compensation parameter value and a preset initial parameter value, the DMRS transmitted by the base station by using the second parameter value, and the user equipment obtains a DMRS RE channel estimation value according to the received DMRS and the computed DMRS transmitted by the base station by using the second parameter value, and that the user equipment performs interpolation filtering on the DMRS RE channel estimation value to obtain channel information of the user data RE, and further the user equipment demodulates the user data according to the channel information of the user data RE.

After receiving the parameter transmitted by the base station, the user equipment first computes, according to the received compensation parameter value and the preset initial parameter value, the DMRS transmitted by the base station by using the second parameter value, and then obtains the DMRS RE channel estimation value according to the received DMRS and the DMRS transmitted by using the second parameter value. The user equipment performs interpolation filtering on the DMRS RE channel estimation value to obtain the channel information of the user data RE, and further, the user equipment demodulates the user data according to the channel information of the user data RE.

The preset initial parameter value is the same as the initial parameter value of the DMRS that is determined by the base station. The preset initial parameter value is the initial parameter value acquired automatically by the user equipment when the user equipment and the base station perform negotiation and the base station determines the initial parameter value of the DMRS.

Optionally, the preset initial parameter value may be a preset initial power value or may be a preset initial amplitude value; the compensation parameter value may be a power compensation value or may be an amplitude compensation value.

Specifically, it is assumed that, $S_{DMRS}$ represents an initial DMRS signal determined by the base station, $\Delta S_{DMRS}$ represents a compensated DMRS signal, h represents an independent channel from the base station to an antenna of the user equipment, y represents a DMRS signal received by the user equipment, and n represents noise superimposed on the channel Therefore, $y=h(S_{DMRS}+\Delta S_{DMRS})+n.$ A DMRS RE channel estimation value obtained by using a Least Square (LS) estimation algorithm is:

$\hat{h}=y/(S_{DMRS}+\Delta S_{DMRS}).$

It can be found that, after receiving the compensation parameter value transmitted by the base station, the user equipment may accurately obtain the DMRS RE channel estimation value by using the compensation parameter, and further demodulate the user data.

The embodiment of the present invention provides a signal transmission method. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 2

Figure 2:
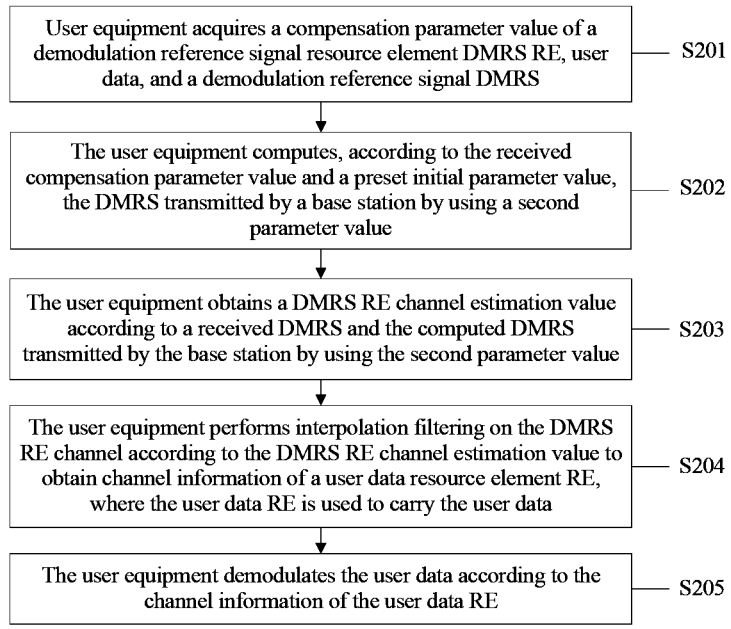
FIG. 2 is a schematic flowchart 2 of a transmission method according to an embodiment of the present invention.

The embodiment of the present invention provides a signal transmission method, as shown in FIG. 2, where the method includes:

S201. User equipment acquires a compensation parameter value of a demodulation reference signal resource element DMRS RE, user data, and a demodulation reference signal DMRS.

The DMRS RE is used to carry the demodulation reference signal DMRS.

Optionally, the compensation parameter value may be a power compensation value or may be an amplitude compensation value.

In a high-dimensional antenna configuration system, high-dimensional antennas at a transmit end and a receive end bring a more significant array gain to demodulation of user data, and an SINR point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, ensure accuracy of channel estimation at a receive end, effectively resolve a resource waste problem of user data resource elements, and improve system power utilization.

First, the user equipment receives the compensation parameter value of the DMRS RE, the user data, and the demodulation reference signal DMRS that are transmitted by a base station.

The compensation parameter value of the DMRS RE, the user data, and the demodulation reference signal DMRS are determined by the base station according to a network-side device of the base station.

S202. The user equipment computes, according to the received compensation parameter value and a preset initial parameter value, the DMRS transmitted by a base station by using a second parameter value.

The second parameter value is a parameter value that is required for transmitting the DMRS and determined by the base station according to an initial parameter value of the DMRS RE and the compensation parameter value, and the initial parameter value is determined by the base station according to network configuration information of the base station, where the network configuration information includes one or more of a quantity of transmit and receive antennas, a transmission order, or a channel estimation algorithm of the user equipment.

Optionally, the initial parameter value may be an initial power value or may be an initial amplitude value.

S203. The user equipment obtains a DMRS RE channel estimation value according to the received DMRS and the computed DMRS transmitted by the base station by using the second parameter value.

After the user equipment determines the DMRS transmitted by the base station by using the second parameter value, the user equipment may obtain the DMRS RE channel estimation value according to the received DMRS and the DMRS transmitted by using the second parameter value.

It may be understood that, to ensure accuracy of channel estimation of the user equipment, the user equipment must obtain the compensation parameter value, and further obtain the DMRS transmitted by the base station.

Optionally, the second parameter value may be a second power value or may be a second amplitude value.

S204. The user equipment performs interpolation filtering on the DMRS RE channel according to the DMRS RE channel estimation value to obtain channel information of a user data resource element RE, where the user data RE is used to carry the user data.

S205. The user equipment demodulates the user data according to the channel information of the user data RE.

The embodiment of the present invention provides a signal transmission method. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 3

Figure 3:
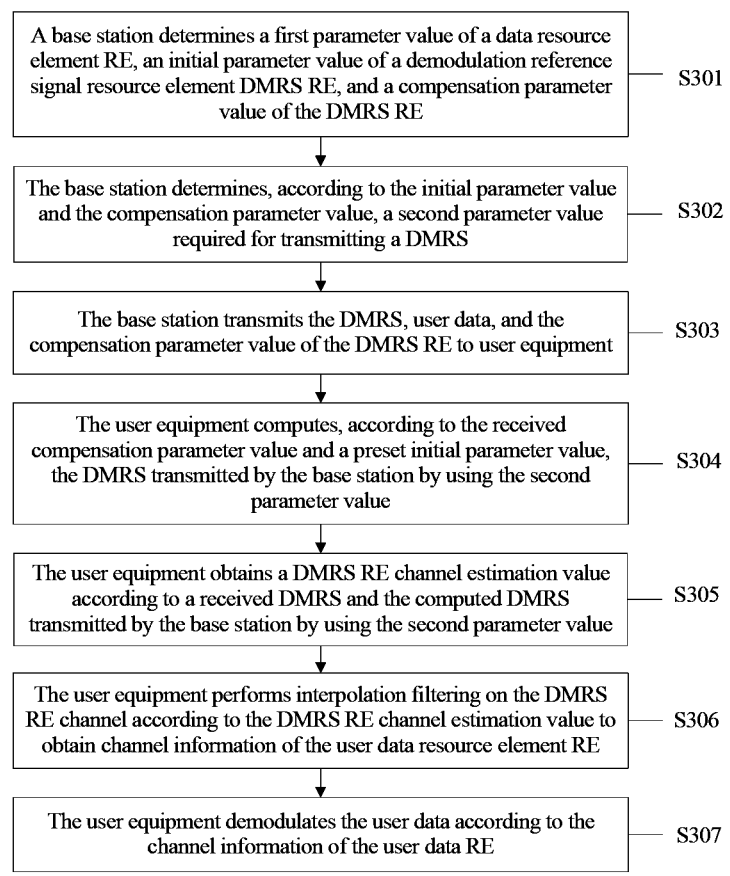
FIG. 3 is a schematic flowchart 3 of a transmission method according to an embodiment of the present invention.

The embodiment of the present invention provides a signal transmission method, as shown in FIG. 3, where the method includes:

S301. A base station determines a first parameter value of a user data resource element RE, an initial parameter value of a demodulation reference signal resource element DMRS RE, and a compensation parameter value of the DMRS RE.

The user data RE is used to carry user data, the first parameter value is used to indicate that the base station transmits the user data by using the first parameter value, and the DMRS RE is used to carry a demodulation reference signal DMRS.

Optionally, the initial parameter value may be an initial power value or may be an initial amplitude value;

the compensation parameter value may be a power compensation value or may be an amplitude compensation value; the first parameter value may be a first power value or may be a first amplitude value.

In a high-dimensional antenna configuration system, high-dimensional antennas at a transmit end and a receive end bring a more significant array gain to demodulation of user data, and an SINR point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, and on a premise of ensuring accuracy of channel estimation at a receive end, effectively resolve a resource waste problem of user data resource elements, and improve system power utilization.

First, the base station determines the first parameter value of the user data resource element RE, the initial parameter value of the demodulation reference signal resource element DMRS RE, and the compensation parameter value of the DMRS RE according to network configuration information of the base station.

The network configuration information includes one or more of a quantity of transmit and receive antennas, a transmission order, or a channel estimation algorithm of user equipment.

Specifically, the compensation parameter value of the DMRS RE is determined by a quantity $N_{Rx}$ of transmit and receive antennas, a quantity $N_{Layer}$ of transmission layers, and a channel estimation algorithm, that is, offset=$f(N_{RX}, N_{Layer})+\xi$ where $\xi$ is an empirical value and is determined by factors such as a channel estimation algorithm.

Optionally, $f(N_{RX},N_{Layer})$ has multiple forms, which are not limited in the embodiment of the present invention.

For example, $f(N_{RX},N_{Layer})=10 \lg(N_{RX}+N_{Layer})$, where the quantity $N_{RX}$ of transmit and receive antennas and the quantity $N_{Layer}$ of transmission layers are parameters scheduled by a base station side.

S302. The base station determines, according to the initial parameter value and the compensation parameter value, a second parameter value required for transmitting a DMRS.

After the base station determines the initial parameter value of the DMRS and the compensation parameter value of the DMRS RE, the base station determines, according to the initial parameter value and the compensation parameter value, the second parameter value required for transmitting the DMRS.

It may be understood that the second parameter value is a parameter value used for actually transmitting the DMRS by the base station.

Optionally, the initial parameter value may be an initial power value or may be an initial amplitude value; the compensation parameter value may be a power compensation value or may be an amplitude compensation value; the second parameter value may be a second power value or may be a second amplitude value.

Specifically, $S_{DMRS}$ represents an initial DMRS signal determined by the base station, and $\Delta S_{DMRS}$ represents a compensated DMRS signal. Therefore, the base station determines, according to $S_{DMRS}$ and $\Delta S_{DMRS}$, that the DMRS signal transmitted by the base station is ($S_{DMRS}+\Delta S_{DMRS}$).

S303. The base station transmits the DMRS, user data, and the compensation parameter value of the DMRS RE to user equipment.

Specifically, the base station processes the user data and the DMRS in a same precoding processing manner, and adds the compensation parameter value of the DMRS RE to explicit signaling or higher layer signaling; the base station transmits the processed user data and DMRS to the user equipment by using a physical downlink shared channel PDSCH or an enhanced physical downlink control channel EPDCCH, and transmits the explicit signaling or higher layer signaling carrying the compensation parameter value of the DMRS RE to the user equipment by using a physical downlink control channel PDCCH or a physical broadcast channel PBCH.

It should be noted that, the explicit signaling or higher layer signaling is obtained by the base station according to the compensation parameter value of the DMRS RE by searching for a feature of an optimal compensation value element in a preset compensation parameter value element set, where the compensation parameter value element set is obtained after design by means of compensation parameter value quantization and the like, where the feature includes a subscript of the compensation value element.

Correspondingly, the compensation parameter value acquired by the user equipment is the compensation parameter value of the DMRS RE that is transmitted by the base station and received by the user equipment, where the compensation parameter value is determined by the base station according to the network configuration information of the base station, where the network configuration information includes one or more of the quantity of transmit and receive antennas, the transmission order, or the channel estimation algorithm of the user equipment;

the user data acquired by the user equipment is the user data that is transmitted by the base station by using the first parameter value of the user data resource element RE and received by the user equipment, where the user data RE is used to carry the user data, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the DMRS acquired by the user equipment is the DMRS that is transmitted by the base station by using the second parameter value and received by the user equipment, where the second parameter value is a parameter value that is required for transmitting the DMRS and determined by the base station according to the initial parameter value of the DMRS RE and the compensation parameter value of the DMRS RE.

Specifically, the user equipment receives the user data and the DMRS from the base station by using the PDSCH or EPDCCH, where the user data and the DMRS are transmitted by the base station after being processed in the same precoding processing manner; the user equipment receives, by using the PDCCH or PBCH, the explicit signaling or higher layer signaling carrying the compensation parameter value of the DMRS RE from the base station, where the explicit signaling or higher layer signaling carrying the compensation parameter value of the DMRS RE is transmitted after the base station adds the compensation parameter value of the DMRS RE to the explicit signaling or higher layer signaling.

S304. The user equipment computes, according to the received compensation parameter value and a preset initial parameter value, the DMRS transmitted by the base station by using the second parameter value.

The second parameter value is a parameter value that is required for transmitting the DMRS and determined by the base station according to the initial parameter value of the DMRS RE and the compensation parameter value, the initial parameter value is determined by the base station according to the network configuration information of the base station, and the initial parameter value includes an initial power value or an initial amplitude value, where the network configuration information includes one or more of the quantity of transmit and receive antennas, the transmission order, or the channel estimation algorithm of the user equipment.

The preset initial parameter value is the same as the initial parameter value of the DMRS that is determined by the base station. The preset initial parameter value is the initial parameter value acquired automatically by the user equipment when the user equipment and the base station perform negotiation and the base station determines the initial parameter value of the DMRS.

Optionally, the preset initial parameter value may be a preset initial power value or may be a preset initial amplitude value.

Specifically, $S_{DMRS}$ represents the initial DMRS signal determined by the base station, $\Delta S_{DMRS}$ represents the compensated DMRS signal, h represents an independent channel from the base station to an antenna of the user equipment, y represents a DMRS signal received by the user equipment, and n represents noise superimposed on the channel Therefore, $$y=h(S_{DMRS}+\Delta S_{DMRS})+n.$$

In the prior art, the user equipment can obtain only the initial DMRS signal $S_{DMRS}$, and receive the DMRS signal y including noise, but cannot obtain an accurate DMRS RE channel estimation value.

To obtain an accurate DMRS RE channel estimation value $\hat{h}=y/(S_{DMRS}+\Delta S_{DMRS})$, the user equipment further needs to obtain the DMRS transmitted by the base station by using the second parameter value. Therefore, the user equipment obtains, according to the received compensation parameter value $\Delta_{DMRS}$ and the preset initial parameter value $S_{DMRS}$, the DMRS transmitted by the base station by using the second parameter value, namely, $(S_{DMRS}+\Delta S_{DMRS})$.

S305. The user equipment obtains a DMRS RE channel estimation value according to the received DMRS and the computed DMRS transmitted by the base station by using the second parameter value.

After the user equipment determines the DMRS transmitted by the base station by using the second parameter value, the user equipment may obtain the DMRS RE channel estimation value according to the received DMRS and the DMRS transmitted by using the second parameter value.

It may be understood that, to ensure accuracy of channel estimation of the user equipment, the user equipment must obtain the compensation parameter value, and further obtain the DMRS transmitted by the base station.

Optionally, the second parameter value may be a second power value or may be a second amplitude value.

Specifically, $S_{DMRS}$ represents the initial DMRS signal determined by the base station, $\Delta S_{DMRS}$ represents the compensated DMRS signal, h represents the independent channel from the base station to the antenna of the user equipment, y represents the DMRS signal received by the user equipment, and n represents the noise superimposed on the channel Therefore, $$y=h(S_{DMRS}+\Delta S_{DMRS})+n.$$

A DMRS RE channel estimation value obtained by using an LS estimation algorithm is:

$$\hat{h}=y/(S_{DMRS}+\Delta S_{DMRS})$$

It can be found that, the user equipment can obtain the DMRS RE channel estimation value according to the received DMRS signal y and the DMRS signal ($S_{DMRS}$+ $\Delta S_{DMRS}$) transmitted by using the second parameter value.

S306. The user equipment performs interpolation filtering on the DMRS RE channel according to the DMRS RE channel estimation value to obtain channel information of the user data resource element RE.

S307. The user equipment demodulates the user data according to the channel information of the user data RE.

The embodiment of the present invention provides a signal transmission method. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 4

Figure 4:
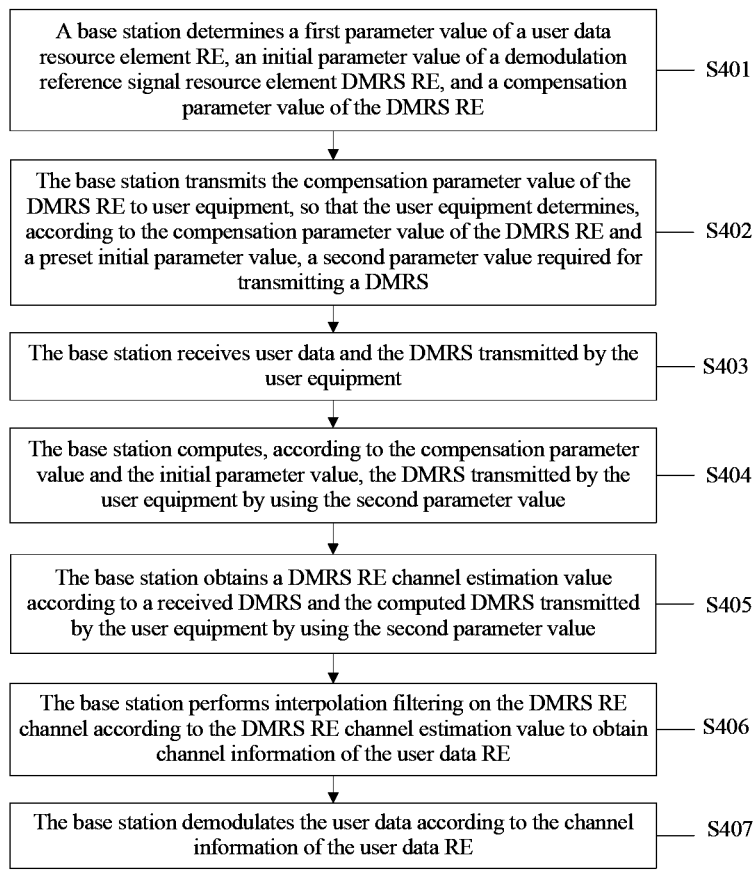
FIG. 4 is a schematic flowchart 4 of a transmission method according to an embodiment of the present invention.

The embodiment of the present invention provides a signal transmission method, as shown in FIG. 4, where the method includes:

S401. A base station determines a first parameter value of a user data resource element RE, an initial parameter value of a demodulation reference signal resource element DMRS RE, and a compensation parameter value of the DMRS RE.

The user data RE is used to carry user data, the first parameter value is used to indicate that user equipment transmits the user data by using the first parameter value, and the DMRS RE is used to carry a demodulation reference signal DMRS.

Optionally, the first parameter value may be a first power value or may be a first amplitude value; the initial parameter value may be an initial power value or may be an initial amplitude value; the compensation parameter value may be a power compensation value or may be an amplitude compensation value.

In a MIMO system, an array gain brought by multiple antennas improves a demodulation effect of user data, but a DMRS cannot obtain an array gain of an HD-MIMO system during demodulation. It is assumed that, there is a point-to-point communications model with one transmit antenna and two receive antennas, $S_{DMRS}$ represents a transmitted DMRS signal, $S_{data}$ represents transmitted user data, $h_1$ and $h_2$ respectively represent independent channels from a transmit end to a first antenna and a second antenna of a receive end, $y_1$ and $y_2$ respectively represent DMRS signals received by the two receive antennas, $y_{1\text{-}data}$ and $y_{2\text{-}data}$ respectively represent received signals after the user data passes through the two channels, and $n_1$ and $n_2$ respectively represent noise superimposed on the two channels Therefore, $$y_1 = h_1 S_{DMRS} + n_1;$$

$$y_2 = h_2 S_{DMRS} + n.$$

A channel estimation value obtained by using a Least Square (LS) estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

User data detected by a receiver is:

$$Y_{data} = \begin{bmatrix} y_{1\_data} \\ y_{2\_data} \end{bmatrix} = \begin{bmatrix} h_1 s_{data} + n_1 \\ h_2 s_{data} + n_2 \end{bmatrix}.$$

A user data estimation value is:

$$\hat{s}_{data} = \hat{h}^H Y_{data} = |h_1|^2 + |h_2|^2 + (h_1 n_1 + h_2 n_2).$$

It can be found that an SNR gain achieved by the multiple antennas for the user data is not brought to channel estimation during demodulation, that is, $$SNR(\hat{s}_{data}) = (|h_1|^2 + |h_2|^2)\frac{P_s}{N} > SNR(\hat{h}_1).$$

In a high-dimensional antenna configuration system, high-dimensional antennas at a transmit end and a receive end bring a more significant array gain to demodulation of user data, and an SINR point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, ensure accuracy of channel estimation at a receive end, effectively resolve a resource waste problem of user data resource elements, and improve system power utilization.

First, the base station determines the first parameter value of the user data resource element RE, the initial parameter value of the demodulation reference signal resource element DMRS RE, and the compensation parameter value of the DMRS RE according to network configuration information of the base station.

The network configuration information includes one or more of a quantity of transmit and receive antennas, a transmission order, or a channel estimation algorithm of the user equipment.

S402. The base station transmits the compensation parameter value of the DMRS RE to user equipment, so that the user equipment determines, according to the compensation parameter value of the DMRS RE and a preset initial parameter value, a second parameter value required for transmitting a DMRS.

After determining the compensation parameter value of the DMRS RE, the base station transmits the compensation parameter value to the user equipment, so that the user equipment determines, according to the compensation parameter value and the preset initial parameter value, the second parameter value required for transmitting the DMRS.

The second parameter value is a parameter value that is required for transmitting the DMRS and determined by the user according to the compensation parameter value of the DMRS RE and the preset initial parameter value; the preset initial parameter value is obtained automatically by the user equipment after the base station determines the preset initial parameter value according to the network configuration information of the base station; the compensation parameter value is determined by the base station according to the network configuration information of the base station, where the network configuration information of the base station includes one or more of the quantity of transmit and receive antennas, the transmission order, or the channel estimation algorithm of the user equipment.

Optionally, the compensation parameter value may be a power compensation value or may be an amplitude compensation value; the initial parameter value may be an initial power value or may be an initial amplitude value; the second parameter value may be a second power value or may be a second amplitude value.

It may be understood that the second parameter value is a parameter value used for actually transmitting the DMRS by the user equipment.

S403. The base station receives user data and the DMRS transmitted by the user equipment.

The base station receives the user data and the DMRS transmitted by the user equipment, where the user data and the DMRS are transmitted by the user equipment after being processed in a same precoding processing manner.

S404. The base station computes, according to the compensation parameter value and the initial parameter value, the DMRS transmitted by the user equipment by using the second parameter value.

The second parameter value is a parameter value that is required for transmitting the DMRS and determined by the user according to the compensation parameter value of the DMRS RE and the preset initial parameter value; the compensation parameter value is determined by the base station according to the network configuration information of the base station; the preset initial parameter value is obtained automatically by the user equipment after the base station determines the preset initial parameter value according to the network configuration information of the base station, where the network configuration information includes one or more of the quantity of transmit and receive antennas, the transmission order, or the channel estimation algorithm of the user equipment.

Optionally, the compensation parameter value may be a power compensation value or may be an amplitude compensation value; the second parameter value may be a second power value or may be a second amplitude value; the initial parameter value may be an initial power value or may be an initial amplitude value.

To implement effective channel estimation, the base station needs to obtain the DMRS actually transmitted by the user equipment, that is, needs to obtain the DMRS transmitted by the user equipment by using the second parameter value.

Specifically, after the base station determines the compensation parameter value of the DMRS RE and the initial parameter value of the DMRS RE according to the network configuration information of the base station, the base station obtains, according to the compensation parameter value and the initial parameter value, the DMRS transmitted by the user equipment by using the second parameter value.

S405. The base station obtains a DMRS RE channel estimation value according to the received DMRS and the computed DMRS transmitted by the user equipment by using the second parameter value.

After the base station determines the DMRS transmitted by the user equipment by using the second parameter value, the base station may obtain the DMRS RE channel estimation value according to the received DMRS and the DMRS transmitted by using the second parameter value.

Optionally, the second parameter value may be a second power value or may be a second amplitude value.

S406. The base station performs interpolation filtering on the DMRS RE channel according to the DMRS RE channel estimation value to obtain channel information of the user data RE.

S407. The base station demodulates the user data according to the channel information of the user data RE.

The embodiment of the present invention provides a signal transmission method. A base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and the DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 5

Figure 5:
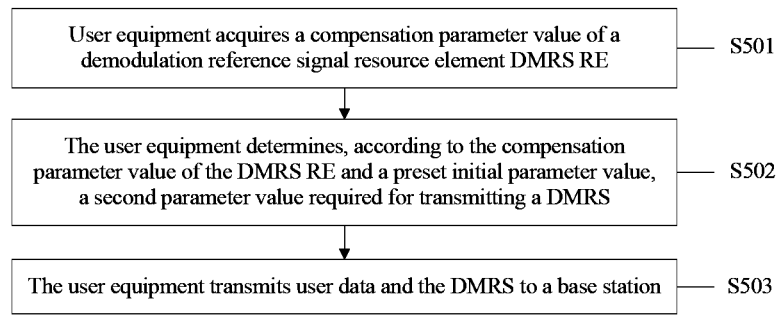
FIG. 5 is a schematic flowchart 5 of a transmission method according to an embodiment of the present invention.

The embodiment of the present invention provides a signal transmission method, as shown in FIG. 5, where the method includes:

S501. User equipment acquires a compensation parameter value of a demodulation reference signal resource element DMRS RE.

The DMRS RE is used to carry a demodulation reference signal DMRS.

Optionally, the compensation parameter value may be a power compensation value or may be an amplitude compensation value.

In a high-dimensional antenna configuration system, high-dimensional antennas at a transmit end and a receive end bring a more significant array gain to demodulation of user data, and an SINR point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, ensure accuracy of channel estimation at a receive end, effectively resolve a resource waste problem of user data resource elements, and improve system power utilization.

First, the user equipment receives the compensation parameter value of the DMRS RE transmitted by a base station.

The compensation parameter value of the DMRS RE is determined by the base station according to a network-side device of the base station.

S502. The user equipment determines, according to the compensation parameter value of the DMRS RE and a preset initial parameter value, a second parameter value required for transmitting a DMRS.

After receiving the compensation parameter value of the DMRS RE transmitted by the base station, the user equipment determines, according to the preset initial parameter value and the compensation parameter value, the second parameter value required for transmitting the DMRS.

The preset initial parameter value is the same as an initial parameter value of the DMRS that is determined by the base station. The preset initial parameter value is the initial parameter value acquired automatically by the user equipment when the user equipment and the base station perform negotiation and the base station determines the initial parameter value of the DMRS.

It may be understood that the second parameter value is a parameter value used for actually transmitting the DMRS by the user equipment.

Optionally, the initial parameter value may be an initial power value or may be an initial amplitude value; the compensation parameter value may be a power compensation value or may be an amplitude compensation value; the second parameter value may be a second power value or may be a second amplitude value.

S503. The user equipment transmits user data and the DMRS to a base station.

After determining the second parameter value for transmitting the DMRS, the user equipment transmits the DMRS and the user data to the base station, so that the base station obtains a DMRS RE channel estimation value according to the received DMRS and the DMRS that is transmitted by the user equipment by using the second parameter value and computed by the base station according to the compensation parameter value and the initial parameter value of the DMRS RE, and the base station performs interpolation filtering on the DMRS RE channel estimation value to obtain channel information of a user data RE, and further the base station demodulates the user data according to the channel information of the user data RE.

The DMRS transmitted by using the second parameter value is computed by the base station according to the compensation parameter value and the initial parameter value of the DMRS RE, the initial parameter value is determined by the base station according to network configuration information of the base station, and the initial parameter value includes an initial power value or an initial amplitude value, where the network configuration information includes one or more of a quantity of transmit and receive antennas, a transmission order, or a channel estimation algorithm of the user equipment.

After receiving the user data and DMRS that are transmitted by the user equipment, the base station first computes, according to the compensation parameter value and the initial parameter value, the DMRS that is transmitted by the user equipment by using the second parameter value, then obtains the DMRS RE channel estimation value according to the received DMRS and the computed DMRS that is transmitted by the user equipment by using the second parameter value. The base station performs interpolation filtering on the DMRS RE channel estimation value to obtain the channel information of the user data RE, and further, the base station demodulates the user data according to the channel information of the user data RE.

Optionally, the initial parameter value may be an initial power value or may be an initial amplitude value; the compensation parameter value may be a power compensation value or may be an amplitude compensation value; the second parameter value may be a second power value or may be a second amplitude value.

Specifically, $S_{DMRS}$ represents an initial DMRS signal determined by the base station, $\Delta S_{DMRS}$ represents a compensated DMRS signal, h represents an independent channel from the user equipment to an antenna of the base station, y represents a DMRS signal received by the base station, and n represents noise superimposed on the channel Therefore, $$y=h(S_{DMRS}+\Delta S_{DMRS})+n.$$

A DMRS RE channel estimation value obtained by using an LS estimation algorithm is:

$$\hat{h}=y/(S_{DMRS}+\Delta S_{DMRS}).$$

It can be found that, after receiving the DMRS transmitted by the user equipment, the base station may accurately obtain the DMRS RE channel estimation value according to the DMRS and the DMRS transmitted by the user equipment by using the second parameter value, and further demodulate the user data.

The embodiment of the present invention provides a signal transmission method. A base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 6

Figure 6:
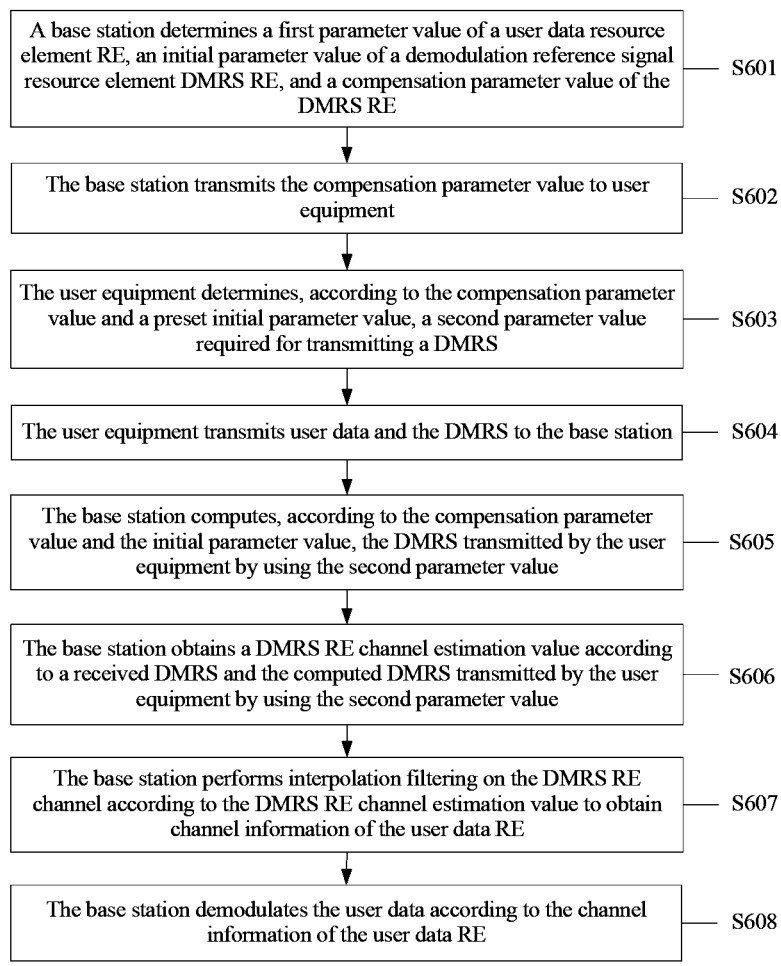
FIG. 6 is a schematic flowchart 6 of a transmission method according to an embodiment of the present invention.

The embodiment of the present invention provides a signal transmission method, as shown in FIG. 6, where the method includes:

S601. A base station determines a first parameter value of a user data resource element RE, an initial parameter value of a demodulation reference signal resource element DMRS RE, and a compensation parameter value of the DMRS RE.

The user data RE is used to carry user data, the first parameter value is used to indicate that user equipment transmits the user data by using the first parameter value, and the DMRS RE is used to carry a demodulation reference signal DMRS.

Optionally, the initial parameter value may be an initial power value or may be an initial amplitude value;

the compensation parameter value may be a power compensation value or may be an amplitude compensation value; the first parameter value may be a first power value or may be a first amplitude value.

In a high-dimensional antenna configuration system, high-dimensional antennas at a transmit end and a receive end bring a more significant array gain to demodulation of user data, and an SINR point at which the user data works may be very low. However, a DMRS cannot obtain an array gain of the high-dimensional antennas, and therefore can work only in a region in which a signal to interference plus noise ratio is relatively high, or otherwise, channel estimation cannot be implemented effectively. In this case, if equal powers are allocated to a user data resource element and a resource element in which the DMRS is located, so as to ensure accuracy of channel estimation at the receive end, the power on the user data RE is wasted greatly, and power efficiency is very low.

The signal transmission method provided by the embodiment of the present invention can allow a certain power difference or amplitude difference between a user data RE and a DMRS RE, and on a premise of ensuring accuracy of channel estimation at a receive end, effectively resolve a resource waste problem of user data resource elements, and improve system power utilization.

First, the base station determines the first parameter value of the user data resource element RE, the initial parameter value of the demodulation reference signal resource element DMRS RE, and the compensation parameter value of the DMRS RE according to network configuration information of the base station.

The network configuration information includes one or more of a quantity of transmit and receive antennas, a transmission order, or a channel estimation algorithm of the user equipment.

Specifically, the compensation parameter value of the DMRS RE is determined by a quantity $N_{RX}$ of transmit and receive antennas, a quantity $N_{Layer}$ of transmission layers, and a channel estimation algorithm, that is, offset=$f(N_{RX}, N_{Layer})$+$\xi$, where $\xi$ is an empirical value and is determined by factors such as a channel estimation algorithm.

Optionally, $f(N_{RX}, N_{Layer})$ has multiple forms, which are not limited in the embodiment of the present invention.

For example, $f(N_{RX}, N_{Layer})$=10 lg($N_{RX}$+$N_{Layer}$), where the quantity $N_{RX}$ of transmit and receive antennas and the quantity $N_{Layer}$ of transmission layers are parameters scheduled by a base station side.

S602. The base station transmits the compensation parameter value to user equipment.

After determining the compensation parameter value of the DMRS RE, the base station transmits the compensation parameter value to the user equipment, so that the user equipment determines, according to the compensation parameter value and a preset initial parameter value, a second parameter value required for transmitting the DMRS.

Specifically, the base station adds the compensation parameter value of the DMRS RE to explicit signaling or higher layer signaling; if the DMRS is transmitted in a physical uplink shared channel PUSCH, the base station transmits the explicit signaling or higher layer signaling carrying the compensation parameter value of the DMRS RE to the user equipment by using a physical downlink control channel PDCCH, a physical broadcast channel PBCH, or a physical downlink shared channel PDSCH; if the DMRS is transmitted in a physical uplink control channel PUCCH, the base station transmits the explicit signaling or higher layer signaling carrying the compensation parameter value of the DMRS RE to the user equipment by using a physical broadcast channel PBCH or a physical downlink shared channel PDSCH.

It should be noted that, the explicit signaling or higher layer signaling is obtained by the base station according to the compensation parameter value of the DMRS RE by searching for a feature of an optimal compensation value element in a preset compensation parameter value element set, where the compensation parameter value element set is obtained after design by means of compensation parameter value quantization and the like, where the feature includes a subscript of the compensation value element.

The second parameter value is a parameter value that is required for transmitting the DMRS and determined by the user according to the compensation parameter value of the DMRS RE and the preset initial parameter value; the preset initial parameter value is obtained automatically by the user equipment after the base station determines the preset initial parameter value according to the network configuration information of the base station; the compensation parameter value is determined by the base station according to the network configuration information of the base station, where the network configuration information of the base station includes one or more of the quantity of transmit and receive antennas, the transmission order, or the channel estimation algorithm of the user equipment.

Optionally, the compensation parameter value may be a power compensation value or may be an amplitude compensation value; the initial parameter value may be an initial power value or may be an initial amplitude value; the second parameter value may be a second power value or may be a second amplitude value.

It may be understood that the second parameter value is a parameter value used for actually transmitting the DMRS by the user equipment.

Correspondingly, the compensation parameter value of the DMRS RE acquired by the user equipment is the compensation parameter value of the DMRS RE transmitted by the base station and received by the user equipment, where the compensation parameter value of the DMRS RE is determined by the base station according to the network configuration information of the base station, where the network configuration information includes one or more of the quantity of transmit and receive antennas, the transmission order, or the channel estimation algorithm of the user equipment.

The DMRS RE is used to carry the demodulation reference signal DMRS.

Optionally, the compensation parameter value may be a power compensation value or may be an amplitude compensation value.

Specifically, if the DMRS is transmitted in a physical uplink shared channel PUSCH, the user equipment receives, by using a PDCCH, a PBCH, or a PDSCH, the explicit signaling or higher layer signaling carrying the compensation parameter value of the DMRS RE from the base station, where the explicit signaling or higher layer signaling carrying the compensation parameter value of the DMRS RE is transmitted after the base station adds the compensation parameter value of the DMRS RE to the explicit signaling or higher layer signaling; if the DMRS is transmitted in a physical uplink control channel PUCCH, the user equipment receives, by using a PBCH or a PDSCH, the explicit signaling or higher layer signaling carrying the compensation parameter value of the DMRS RE from the base station, where the explicit signaling or higher layer signaling carrying the compensation parameter value of the DMRS RE is transmitted after the base station adds the compensation parameter value of the DMRS RE to the explicit signaling or higher layer signaling.

S603. The user equipment determines, according to the compensation parameter value and a preset initial parameter value, a second parameter value required for transmitting a DMRS.

It may be understood that the second parameter value is a parameter value used for actually transmitting the DMRS by the user equipment.

The preset initial parameter value is the same as the initial parameter value of the DMRS that is determined by the base station. The preset initial parameter value is the initial parameter value acquired automatically by the user equipment when the user equipment and the base station perform negotiation and the base station determines the initial parameter value of the DMRS.

Optionally, the initial parameter value may be an initial power value or may be an initial amplitude value; the compensation parameter value may be a power compensation value or may be an amplitude compensation value; the second parameter value may be a second power value or may be a second amplitude value.

Specifically, $S_{DMRS}$ represents an initial DMRS signal determined by the base station, and $\Delta S_{DMRS}$ represents a compensated DMRS signal. Therefore, the user equipment determines, according to $S_{DMRS}$ and $\Delta S_{DMRS}$, that the DMRS signal transmitted by the user equipment is ($S_{DMRS}$+$\Delta S_{DMRS}$).

S604. The user equipment transmits user data and the DMRS to the base station.

Specifically, the user equipment processes the user data and the DMRS in a same precoding processing manner; if the DMRS is transmitted in a physical uplink shared channel PUSCH, the user equipment transmits the processed user data and DMRS to the base station by using the PUSCH, where the DMRS is transmitted by the user equipment by using the second parameter value, and the user data is transmitted by the user equipment by using the first parameter value; if the DMRS is transmitted in a physical uplink control channel PUCCH, the user equipment transmits the processed user data and DMRS to the base station by using the PUCCH, where the DMRS is transmitted by the user equipment by using the second parameter value, and the user data is transmitted by the user equipment by using the first parameter value.

Optionally, the first parameter value may be a first power value or may be a first amplitude value, and the second parameter value may be a second power value or may be a second amplitude value.

Correspondingly, if the DMRS is transmitted in a physical uplink shared channel PUSCH, the base station receives the user data and the DMRS from the user equipment by using the PUSCH, where the user data and the DMRS are transmitted by the user equipment after being processed in a same precoding processing manner, the DMRS is transmitted by the user equipment by using the second parameter value, and the user data is transmitted by the user equipment by using the first parameter value; if the DMRS is transmitted in a physical uplink control channel PUCCH, the base station receives the user data and the DMRS from the user equipment by using the PUCCH, where the user data and the DMRS are transmitted by the user equipment after being processed in a same precoding processing manner, the DMRS is transmitted by the user equipment by using the second parameter value, and the user data is transmitted by the user equipment by using the first parameter value.

Optionally, the first parameter value may be a first power value or may be a first amplitude value, and the second parameter value may be a second power value or may be a second amplitude value.

Specifically, $S_{DMRS}$ represents the initial DMRS signal determined by the base station, $\Delta S_{DMRS}$ represents the compensated DMRS signal, h represents an independent channel from the user equipment to an antenna of the base station, y represents a DMRS signal received by the base station, and n represents noise superimposed on the channel Therefore, $$y=h(S_{DMRS}+\Delta S_{DMRS})+n.$$

It can be found that, the DMRS that is transmitted by the user equipment and received by the base station includes noise.

S605. The base station computes, according to the compensation parameter value and the initial parameter value, the DMRS transmitted by the user equipment by using the second parameter value.

After the base station determines the initial parameter value of the DMRS and the compensation parameter value of the DMRS RE, the base station determines, according to the initial parameter value and the compensation parameter value, the DMRS transmitted by the user equipment by using the second parameter value.

It may be understood that the second parameter value is a parameter value used for actually transmitting the DMRS by the user equipment.

Optionally, the initial parameter value may be an initial power value or may be an initial amplitude value; the compensation parameter value may be a power compensation value or may be an amplitude compensation value; the second parameter value may be a second power value or may be a second amplitude value.

Specifically, $S_{DMRS}$ represents the initial DMRS signal determined by the base station, and $\Delta S_{DMRS}$ represents the compensated DMRS signal. Therefore, the base station determines, according to $S_{DMRS}$ and $\Delta S_{DMRS}$, that the DMRS signal transmitted by the user equipment is ($S_{DMRS}$+$\Delta S_{DMRS}$).

S606. The base station obtains a DMRS RE channel estimation value according to the received DMRS and the computed DMRS transmitted by the user equipment by using the second parameter value.

After the base station determines the DMRS transmitted by the user equipment by using the second parameter value, the base station may obtain the DMRS RE channel estimation value according to the received DMRS and the DMRS transmitted by using the second parameter value.

Optionally, the second parameter value may be a second power value or may be a second amplitude value.

Specifically, $S_{DMRS}$ represents the initial DMRS signal determined by the base station, $\Delta S_{DMRS}$ represents the compensated DMRS signal, h represents the independent channel from the user equipment to the antenna of the base station, y represents the DMRS signal received by the base station, and n represents the noise superimposed on the channel Therefore, $$y = h(S_{DMRS} + \Delta S_{DMRS}) + n.$$

A DMRS RE channel estimation value obtained by using an LS estimation algorithm is:

$$\hat{h} = y/(S_{DMRS} + \Delta S_{DMRS}).$$

It can be found that, the base station can obtain the DMRS RE channel estimation value according to the received DMRS signal y and the DMRS signal ($S_{DMRS}$+$\Delta S_{DMRS}$) transmitted by using the second parameter value.

S607. The base station performs interpolation filtering on the DMRS RE channel according to the DMRS RE channel estimation value to obtain channel information of the user data RE.

S608. The base station demodulates the user data according to the channel information of the user data RE.

The embodiment of the present invention provides a signal transmission method. A base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 7

Figure 7:
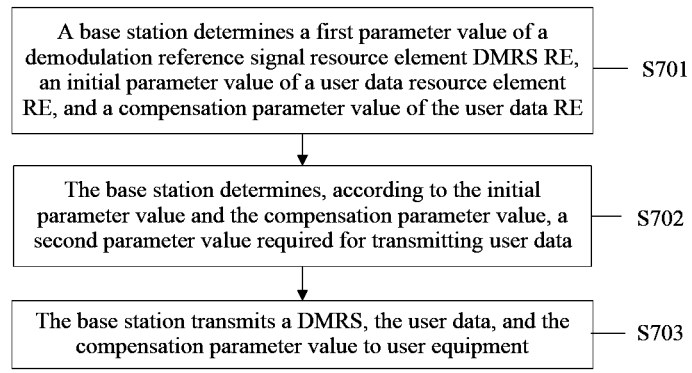
FIG. 7 is a schematic flowchart 7 of a transmission method according to an embodiment of the present invention.

The embodiment of the present invention provides a signal transmission method, as shown in FIG. 7, where the method includes:

S701. A base station determines a first parameter value of a demodulation reference signal resource element DMRS RE, an initial parameter value of a user data resource element RE, and a compensation parameter value of the user data RE.

The user data RE is used to carry user data, the first parameter value is used to indicate that the base station transmits a DMRS by using the first parameter value, and the DMRS RE is used to carry the demodulation reference signal DMRS.

Optionally, the first parameter value includes a first power value, the initial parameter value includes an initial power value, and the compensation parameter value includes a power compensation value; or the first parameter value includes a first amplitude value, the initial parameter value includes an initial amplitude value, and the compensation parameter value includes an amplitude compensation value.

S702. The base station determines, according to the initial parameter value and the compensation parameter value, a second parameter value required for transmitting user data.

After the base station determines the initial parameter value of the user data RE and the compensation parameter value of the user data RE, the base station determines, according to the initial parameter value and the compensation parameter value, the second parameter value required for transmitting the user data.

It may be understood that the second parameter value is a parameter value used for actually transmitting the user data by the base station.

Optionally, the initial parameter value may be an initial power value or may be an initial amplitude value;

the compensation parameter value may be a power compensation value or may be an amplitude compensation value; the second parameter value may be a second power value or may be a second amplitude value.

S703. The base station transmits a DMRS, the user data, and the compensation parameter value to user equipment.

After determining the second parameter value for transmitting the user data, the base station transmits the DMRS, the user data, and the compensation parameter value of the user data RE to the user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value.

After receiving the parameter transmitted by the base station, the user equipment first computes, according to the received compensation parameter value and the preset initial parameter value, the user data transmitted by the base station by using the second parameter value. The user equipment obtains the DMRS RE channel estimation value according to the received DMRS. The user equipment performs interpolation filtering on the DMRS RE channel estimation value to obtain the channel information of the user data RE, and further, the user equipment demodulates the user data according to the channel information of the user data RE and the computed user data transmitted by the base station by using the second parameter value.

The preset initial parameter value is the same as the initial parameter value of the user data that is determined by the base station. The preset initial parameter value is the initial parameter value acquired automatically by the user equipment when the user equipment and the base station perform negotiation and the base station determines the initial parameter value of the user data.

Optionally, the initial parameter value may be an initial power value or may be an initial amplitude value; the compensation parameter value may be a power compensation value or may be an amplitude compensation value.

For example, it is assumed that, there is a point-to-point communications model with one transmit antenna and two receive antennas, $S_{DMRS}$ represents a transmitted DMRS signal, $S_{data}$ represents an initial user data signal determined by the base station, $\Delta S_{data}$ represents a compensated user data signal, $h_1$ and $h_2$ respectively represent independent channels from a base station to a first antenna and a second antenna of user equipment, $y_{1\text{-}data}$ and $y_{2\text{-}data}$ respectively represent received signals after the user data passes through the two channels, and $n_1$ and $n_2$ respectively represent noise superimposed on the two channels Therefore, $$y_1 = h_1 S_{DMRS} + n_1;$$

$$y_2 = h_2 S_{DMRS} + n.$$

A DMRS RE channel estimation value obtained by using an LS estimation algorithm is:

$$\hat{h} = \begin{bmatrix} \hat{h}_1 \\ \hat{h}_2 \end{bmatrix} = \begin{bmatrix} y_1 / S_{DMRS} \\ y_2 / S_{DMRS} \end{bmatrix}.$$

User data detected by the user equipment is:

$$Y_{data} = \begin{bmatrix} y_{1\_data} \\ y_{2\_data} \end{bmatrix} = \begin{bmatrix} h_1(S_{data} + \Delta S_{data}) + n_1 \\ h_2(S_{data} + \Delta S_{data}) + n_2 \end{bmatrix}.$$

It can be found that, the user data received by the user equipment includes noise. The user equipment needs to obtain user data ($S_{data} + \Delta S_{data}$) transmitted by using the second parameter value and channel information of the user data RE, so that the user equipment can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 8

Figure 8:
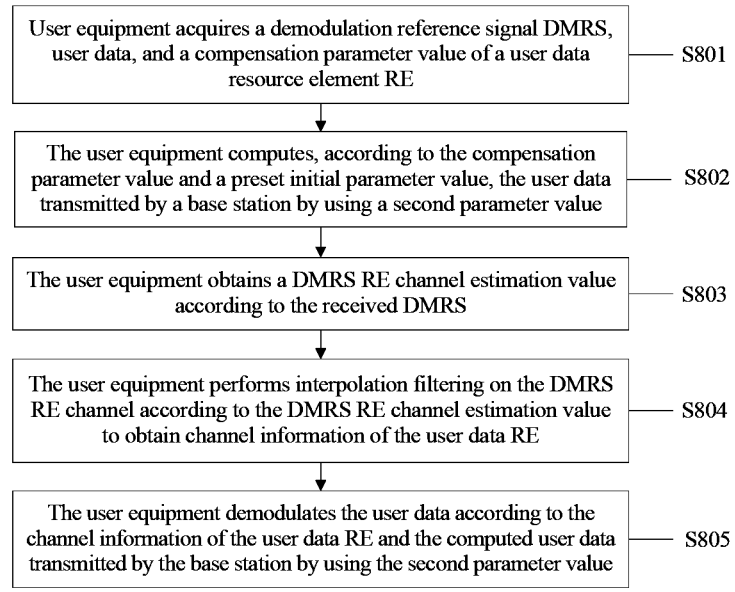
FIG. 8 is a schematic flowchart 8 of a transmission method according to an embodiment of the present invention.

The embodiment of the present invention provides a signal transmission method, as shown in FIG. 8, where the method includes:

S801. User equipment acquires a demodulation reference signal DMRS, user data, and a compensation parameter value of a user data resource element RE.

The user data RE is used to carry the user data.

Optionally, the compensation parameter value may be a power compensation value or may be an amplitude compensation value.

Specifically, the compensation parameter value acquired by the user equipment is the compensation parameter value of the user data RE that is transmitted by a base station and received by the user equipment, where the compensation parameter value is determined by the base station according to network configuration information of the base station, where the network configuration information includes one or more of a quantity of transmit and receive antennas, a transmission order, or a channel estimation algorithm of the user equipment; the DMRS acquired by the user equipment is the DMRS that is transmitted by the base station by using a first parameter value of a demodulation reference signal resource element DMRS RE and received by the user equipment, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the user equipment is the user data that is transmitted by the base station by using a second parameter value and received by the user equipment, where the second parameter value is the parameter value that is required for transmitting the user data and determined by the base station according to an initial parameter value of the user data RE and the compensation parameter value of the user data RE.

Specifically, the user equipment receives the user data and the DMRS from the base station by using a PDSCH or an EPDCCH, where the user data and the DMRS are transmitted by the base station after being processed in a same precoding processing manner; the user equipment receives, by using a PDCCH or a PBCH, explicit signaling or higher layer signaling carrying the compensation parameter value of the user data RE from the base station, where the explicit signaling or higher layer signaling carrying the compensation parameter value of the user data RE is transmitted after the base station adds the compensation parameter value of the user data RE to the explicit signaling or higher layer signaling.

It should be noted that, the explicit signaling or higher layer signaling is obtained by the base station according to the compensation parameter value of the DMRS RE by searching for a feature of an optimal compensation value element in a preset compensation parameter value element set, where the compensation parameter value element set is obtained after design by means of compensation parameter value quantization and the like, where the feature includes a subscript of the compensation value element.

S802. The user equipment computes, according to the compensation parameter value and a preset initial parameter value, the user data transmitted by a base station by using a second parameter value.

The second parameter value is a parameter value that is required for transmitting the user data and determined by the base station according to the initial parameter value of the user data RE and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the initial parameter value may be an initial power value or may be an initial amplitude value.

For example, $S_{data}$ represents an initial user data signal determined by the base station, and $\Delta S_{data}$ represents a compensated user data signal. Therefore, the user equipment obtains, according to the compensated user data signal $\Delta S_{data}$ and the preset initial user data signal $S_{data}$, user data $(S_{data}+\Delta S_{data})$ transmitted by the base station by using the second parameter value.

S803. The user equipment obtains a DMRS RE channel estimation value according to the received DMRS.

It may be understood that, the user equipment may obtain the DMRS RE channel estimation value directly according to the DMRS after receiving the DMRS transmitted by the base station, which is not repeated hereinafter.

For example, there is a point-to-point communications model with one transmit antenna and two receive antennas, $S_{DMRS}$ represents a transmitted DMRS signal, $h_1$ and $h_2$ respectively represent independent channels from a base station to a first antenna and a second antenna of user equipment, $y_1$ and $y_2$ respectively represent DMRS signals received by the two receive antennas, and $n_1$ and $n_2$ respectively represent noise superimposed on the two channels Therefore, $$y_1 = h_1 S_{DMRS} + n_1;$$

$$y_2 = h_2 S_{DMRS} + n.$$

A DMRS RE channel estimation value obtained by using an LS estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

S804. The user equipment performs interpolation filtering on the DMRS RE channel according to the DMRS RE channel estimation value to obtain channel information of the user data RE.

The DMRS and user data that are transmitted by the base station to the user equipment are located in different resource elements of a same channel After obtaining the DMRS RE channel estimation value, the user equipment performs interpolation filtering on the DMRS RE channel according to the channel estimation value to obtain the channel information of the user data RE.

S805. The user equipment demodulates the user data according to the channel information of the user data RE and the computed user data transmitted by the base station by using the second parameter value.

The second parameter value is a parameter value that is required for transmitting the user data and determined by the base station according to an initial parameter value of the user data RE and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the second parameter value may be a second power value or may be a second amplitude value.

For example, $S_{data}$ represents the initial user data signal determined by the base station, $\Delta S_{data}$ represents the compensated user data signal, $h_1$ and $h_2$ respectively represent independent channels from the base station to a first antenna and a second antenna of the user equipment, $y_{1\text{-}data}$ and $y_{2\text{-}data}$ respectively represent received signals after the user data passes through the two channels, and $n_1$ and $n_2$ respectively represent noise superimposed on the two channels Therefore, user data detected by the user equipment is:

$$Y_{data} = \begin{bmatrix} y_{1\_data} \\ y_{2\_data} \end{bmatrix} = \begin{bmatrix} h_1(S_{data}+\Delta S_{data})+n_1 \\ h_2(S_{data}+\Delta S_{data})+n_2 \end{bmatrix}.$$

It can be found that, the user data received by the user equipment includes noise. The user equipment needs to obtain user data $(S_{data}+\Delta S_{data})$ transmitted by using the second parameter value and channel information of the user data RE, so that the user equipment can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 9

Figure 9:
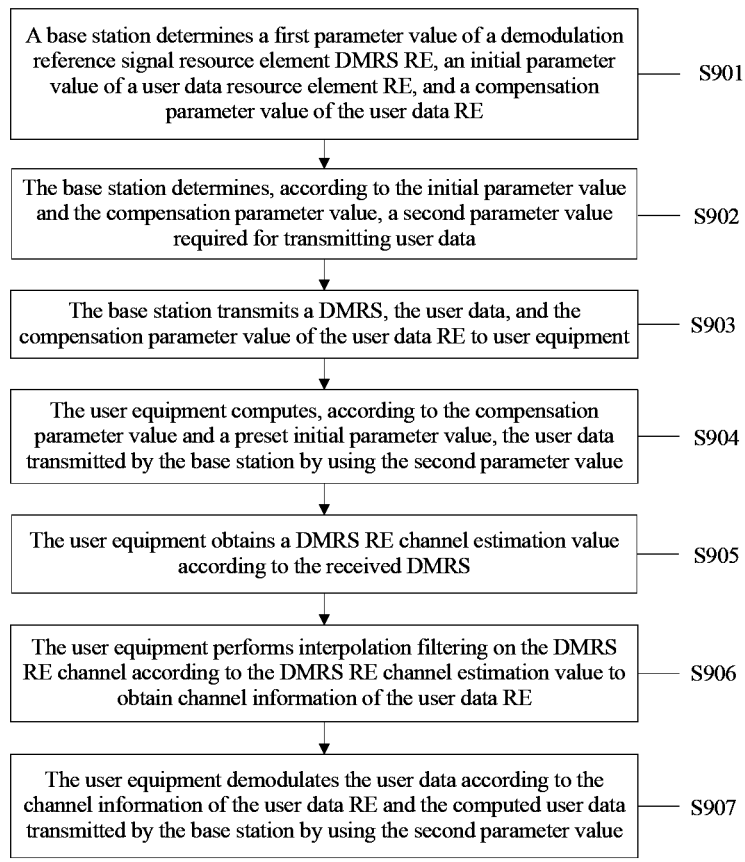
FIG. 9 is a schematic flowchart 9 of a transmission method according to an embodiment of the present invention.

The embodiment of the present invention provides a signal transmission method, as shown in FIG. 9, where the method includes:

S901. A base station determines a first parameter value of a demodulation reference signal resource element DMRS RE, an initial parameter value of a user data resource element RE, and a compensation parameter value of the user data RE.

The user data RE is used to carry user data, the first parameter value is used to indicate that the base station transmits a DMRS by using the first parameter value, and the DMRS RE is used to carry the demodulation reference signal DMRS.

The base station determines the first parameter value of the demodulation reference signal resource element DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of user equipment.

Optionally, the initial parameter value may be an initial power value or may be an initial amplitude value; the compensation parameter value may be a power compensation value or may be an amplitude compensation value; the first parameter value may be a first power value or may be a first amplitude value.

Specifically, the compensation parameter value of the user data RE is determined by a quantity $N_{RX}$ of transmit and receive antennas, a quantity $N_{Layer}$ of transmission layers, and a channel estimation algorithm, that is, offset=$f(N_{RX}, N_{Layer})+\xi$ where $\xi$ is an empirical value and is determined by factors such as a channel estimation algorithm.

Optionally, $f(N_{RX}, N_{Layer})$ has multiple forms, which are not limited in the embodiment of the present invention.

For example, $f(N_{RX}, N_{Layer})=10 \lg(N_{RX}+N_{Layer})$, where the quantity $N_{RX}$ of transmit and receive antennas and the quantity $N_{Layer}$ of transmission layers are parameters scheduled by a base station side.

S902. The base station determines, according to the initial parameter value and the compensation parameter value, a second parameter value required for transmitting user data.

After the base station determines the initial parameter value of the user data RE and the compensation parameter value of the user data RE, the base station determines, according to the initial parameter value and the compensation parameter value, the second parameter value required for transmitting the user data.

It may be understood that the second parameter value is a parameter value used for actually transmitting the user data by the base station.

Optionally, the initial parameter value may be an initial power value or may be an initial amplitude value; the compensation parameter value may be a power compensation value or may be an amplitude compensation value; the second parameter value may be a second power value or may be a second amplitude value.

S903. The base station transmits a DMRS, the user data, and the compensation parameter value of the user data RE to user equipment.

After determining the second parameter value for transmitting the user data, the base station transmits the DMRS, the user data, and the compensation parameter value of the user data RE to the user equipment.

Optionally, the compensation parameter value may be a power compensation value or may be an amplitude compensation value.

Specifically, the base station processes the user data and the DMRS in a same precoding processing manner, and adds the compensation parameter value of the user data RE to explicit signaling or higher layer signaling; the base station transmits the processed user data and DMRS to the user equipment by using a physical downlink shared channel PDSCH or an enhanced physical downlink control channel EPDCCH, and transmits the explicit signaling or higher layer signaling carrying the compensation parameter value of the user data RE to the user equipment by using a physical downlink control channel PDCCH or a physical broadcast channel PBCH.

It should be noted that, the explicit signaling or higher layer signaling is obtained by the base station according to the compensation parameter value of the DMRS RE by searching for a feature of an optimal compensation value element in a preset compensation parameter value element set, where the compensation parameter value element set is obtained after design by means of compensation parameter value quantization and the like, where the feature includes a subscript of the compensation value element.

Correspondingly, the compensation parameter value acquired by the user equipment is the compensation parameter value of the user data RE that is transmitted by the base station and received by the user equipment, where the compensation parameter value is determined by the base station according to the network configuration information of the base station, where the network configuration information includes one or more of the quantity of transmit and receive antennas, the transmission order, or the channel estimation algorithm of the user equipment; the DMRS acquired by the user equipment is the DMRS that is transmitted by the base station by using the first parameter value of the demodulation reference signal resource element DMRS RE and received by the user equipment, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the user equipment is the user data that is transmitted by the base station by using the second parameter value and received by the user equipment, where the second parameter value is a parameter value that is required for transmitting the user data and determined by the base station according to the initial parameter value of the user data RE and the compensation parameter value of the user data RE.

Specifically, the user equipment receives the user data and the DMRS from the base station by using the PDSCH or EPDCCH, where the user data and the DMRS are transmitted by the base station after being processed in the same precoding processing manner; the user equipment receives, by using the PDCCH or PBCH, the explicit signaling or higher layer signaling carrying the compensation parameter value of the user data RE from the base station, where the explicit signaling or higher layer signaling carrying the compensation parameter value of the user data RE is transmitted after the base station adds the compensation parameter value of the user data RE to the explicit signaling or higher layer signaling.

S904. The user equipment computes, according to the compensation parameter value and a preset initial parameter value, the user data transmitted by the base station by using the second parameter value.

The second parameter value is the parameter value that is required for transmitting the user data and determined by the base station according to the initial parameter value of the user data RE and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the initial parameter value may be an initial power value or may be an initial amplitude value.

For example, $S_{data}$ represents an initial user data signal determined by the base station, and $\Delta S_{data}$ represents a compensated user data signal. Therefore, the user equipment obtains, according to the compensated user data signal $\Delta S_{data}$ and the preset initial user data signal $S_{data}$, user data ($S_{data}+\Delta S_{data}$) transmitted by the base station by using the second parameter value.

S905. The user equipment obtains a DMRS RE channel estimation value according to the received DMRS.

It may be understood that, the user equipment may obtain the DMRS RE channel estimation value directly according to the DMRS after receiving the DMRS transmitted by the base station, which is not repeated hereinafter.

For example, there is a point-to-point communications model with one transmit antenna and two receive antennas, $S_{DMRS}$ represents a transmitted DMRS signal, $h_1$ and $h_2$ respectively represent independent channels from a base station to a first antenna and a second antenna of user equipment, $y_1$ and $y_2$ respectively represent DMRS signals received by the two receive antennas, and $n_1$ and $n_2$ respectively represent noise superimposed on the two channels Therefore, $y_1 = h_1 S_{DMRS} + n_1;$ $y_2 = h_2 S_{DMRS} + n.$ A DMRS RE channel estimation value obtained by using an LS estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

S906. The user equipment performs interpolation filtering on the DMRS RE channel according to the DMRS RE channel estimation value to obtain channel information of the user data RE.

The DMRS and user data that are transmitted by the base station to the user equipment are located in different resource elements of a same channel After obtaining the DMRS RE channel estimation value, the user equipment performs interpolation filtering on the DMRS RE channel according to the channel estimation value to obtain the channel information of the user data RE.

S907. The user equipment demodulates the user data according to the channel information of the user data RE and the computed user data transmitted by the base station by using the second parameter value.

The second parameter value is the parameter value that is required for transmitting the user data and determined by the base station according to the initial parameter value of the user data RE and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the second parameter value may be a second power value or may be a second amplitude value.

For example, $S_{data}$ represents the initial user data signal determined by the base station, $\Delta S_{data}$ represents the compensated user data signal, $h_1$ and $h_2$ respectively represent independent channels from the base station to a first antenna and a second antenna of the user equipment, $y_{1\text{-}data}$ and $y_{2\text{-}data}$ respectively represent received signals after the user data passes through the two channels, and $n_1$ and $n_2$ respectively represent noise superimposed on the two channels Therefore, user data detected by the user equipment is:

$$Y_{data} = \begin{bmatrix} y_{1\_data} \\ y_{2\_data} \end{bmatrix} = \begin{bmatrix} h_1(S_{data}+\Delta S_{data})+n_1 \\ h_2(S_{data}+\Delta S_{data})+n_2 \end{bmatrix}.$$

It can be found that, the user data received by the user equipment includes noise. The user equipment needs to obtain user data ($S_{data}+\Delta S_{data}$) transmitted by using the second parameter value and channel information of the user data RE, so that the user equipment can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 10

Figure 10:
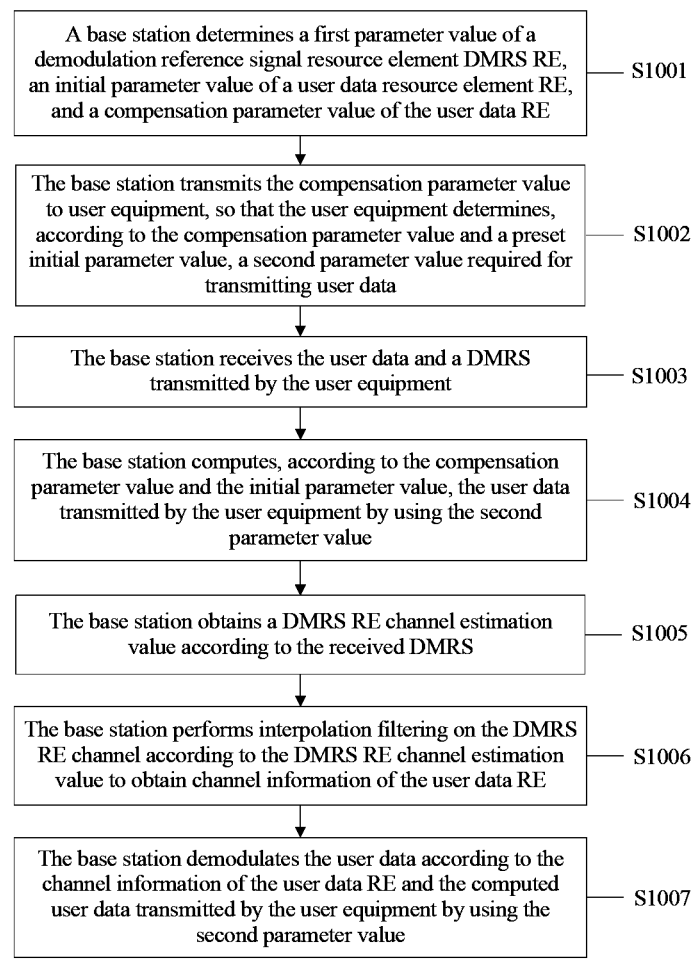
FIG. 10 is a schematic flowchart 10 of a transmission method according to an embodiment of the present invention.

The embodiment of the present invention provides a signal transmission method, as shown in FIG. 10, where the method includes:

S1001. A base station determines a first parameter value of a demodulation reference signal resource element DMRS RE, an initial parameter value of a user data resource element RE, and a compensation parameter value of the user data RE.

The base station determines the first parameter value of the DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of user equipment.

The user data RE is used to carry user data, the first parameter value is used to indicate that the user equipment transmits a DMRS by using the first parameter value, and the DMRS RE is used to carry the demodulation reference signal DMRS.

Optionally, the first parameter value may be a first power value or may be a first amplitude value; the initial parameter value may be an initial power value or may be an initial amplitude value; the compensation parameter value may be a power compensation value or may be an amplitude compensation value.

Specifically, the compensation parameter value of the user data RE is determined by a quantity $N_{RX}$ of transmit and receive antennas, a quantity $N_{Layer}$ of transmission layers, and a channel estimation algorithm, that is, offset=$f(N_{RX}, N_{Layer})+\xi$, where $\xi$ is an empirical value and is determined by factors such as a channel estimation algorithm.

Optionally, $f(N_{RX}, N_{Layer})$ has multiple forms, which are not limited in the embodiment of the present invention.

For example, $f(N_{RX}, N_{Layer})=10 \lg f(N_{RX}, N_{Layer})$, where the quantity $N_{RX}$ of transmit and receive antennas and the quantity $N_{Layer}$ of transmission layers are parameters scheduled by a base station side.

S1002. The base station transmits the compensation parameter value to user equipment, so that the user equipment determines, according to the compensation parameter value and a preset initial parameter value, a second parameter value required for transmitting user data.

After determining the compensation parameter value of the user data RE, the base station transmits the compensation parameter value to the user equipment, so that the user equipment determines, according to the compensation parameter value and the preset initial parameter value, the second parameter value required for transmitting the user data.

The second parameter value is a parameter value that is required for transmitting the user data and determined by the user according to the compensation parameter value of the user data RE and the preset initial parameter value; the preset initial parameter value is obtained automatically by the user equipment after the base station determines the preset initial parameter value according to the network configuration information of the base station; the compensation parameter value is determined by the base station according to the network configuration information of the base station, where the network configuration information includes one or more of the quantity of transmit and receive antennas, the transmission order, or the channel estimation algorithm of the user equipment.

Optionally, the compensation parameter value may be a power compensation value or may be an amplitude compensation value; the initial parameter value may be an initial power value or may be an initial amplitude value; the second parameter value may be a second power value or may be a second amplitude value.

It may be understood that the second parameter value is a parameter value used for actually transmitting the user data by the user equipment.

S1003. The base station receives the user data and a DMRS transmitted by the user equipment.

The base station receives the user data and the DMRS transmitted by the user equipment, where the user data and the DMRS are transmitted by the user equipment after being processed in a same precoding processing manner.

S1004. The base station computes, according to the compensation parameter value and the initial parameter value, the user data transmitted by the user equipment by using the second parameter value.

The second parameter value is the parameter value that is required for transmitting the user data and determined by the user according to the compensation parameter value of the user data RE and the preset initial parameter value; the compensation parameter value is determined by the base station according to the network configuration information of the base station; the preset initial parameter value is obtained automatically by the user equipment after the base station determines the preset initial parameter value according to the network configuration information of the base station, where the network configuration information includes one or more of the quantity of transmit and receive antennas, the transmission order, or the channel estimation algorithm of the user equipment.

Optionally, the compensation parameter value may be a power compensation value or may be an amplitude compensation value; the second parameter value may be a second power value or may be a second amplitude value; the initial parameter value may be an initial power value or may be an initial amplitude value.

To implement effective channel estimation, the base station needs to obtain the user data actually transmitted by the user equipment, that is, needs to obtain the user data transmitted by the user equipment by using the second parameter value.

Specifically, after the base station determines the compensation parameter value of the user data RE and the initial parameter value of the user data RE according to the network configuration information of the base station, the base station computes, according to the compensation parameter value and the initial parameter value, the user data transmitted by the user equipment by using the second parameter value.

S1005. The base station obtains a DMRS RE channel estimation value according to the received DMRS.

It may be understood that, the base station may obtain the DMRS RE channel estimation value directly according to the DMRS after receiving the DMRS transmitted by the user equipment, which is not repeated hereinafter.

For example, there is a point-to-point communications model with one transmit antenna and two receive antennas, $S_{DMRS}$ represents a transmitted DMRS signal, $h_1$ and $h_2$ respectively represent independent channels from user equipment to a first antenna and a second antenna of a base station, $y_1$ and $y_2$ respectively represent DMRS signals received by the two receive antennas, and $n_1$ and $n_2$ respectively represent noise superimposed on the two channels Therefore, $y_1 = h_1 S_{DMRS} + n_1;$ $y_2 = h_2 S_{DMRS} + n.$ A DMRS RE channel estimation value obtained by using an LS estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

S1006. The base station performs interpolation filtering on the DMRS RE channel according to the DMRS RE channel estimation value to obtain channel information of the user data RE.

The DMRS and user data that are transmitted by the user equipment to the base station are located in different resource elements of a same channel After obtaining the DMRS RE channel estimation value, the user equipment performs interpolation filtering on the DMRS RE channel according to the channel estimation value to obtain the channel information of the user data RE.

S1007. The base station demodulates the user data according to the channel information of the user data RE and the computed user data transmitted by the user equipment by using the second parameter value.

The second parameter value is the parameter value that is required for transmitting the user data and determined by the user equipment according to the preset initial parameter value and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the second parameter value may be a second power value or may be a second amplitude value.

For example, $S_{data}$ represents an initial user data signal determined by the base station, $\Delta S_{data}$ represents a compensated user data signal, $h_1$ and $h_2$ respectively represent independent channels from the user equipment to a first antenna and a second antenna of the base station, $y_{1\text{-}data}$ and $y_{2\text{-}data}$ respectively represent received signals after the user data passes through the two channels, and $n_1$ and $n_2$ respectively represent noise superimposed on the two channels Therefore, user data detected by the base station is:

$$Y_{data} = \begin{bmatrix} y_{1\_data} \\ y_{2\_data} \end{bmatrix} = \begin{bmatrix} h_1(S_{data} + \Delta S_{data}) + n_1 \\ h_2(S_{data} + \Delta S_{data}) + n_2 \end{bmatrix}.$$

It can be found that, the user data received by the base station includes noise. The base station needs to compute channel information of user $(S_{data} + \Delta S_{data})$ that is transmitted by using the second parameter value and channel information of the user, so that the base station can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and computes, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the computed user data transmitted by the user equipment by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 11

Figure 11:
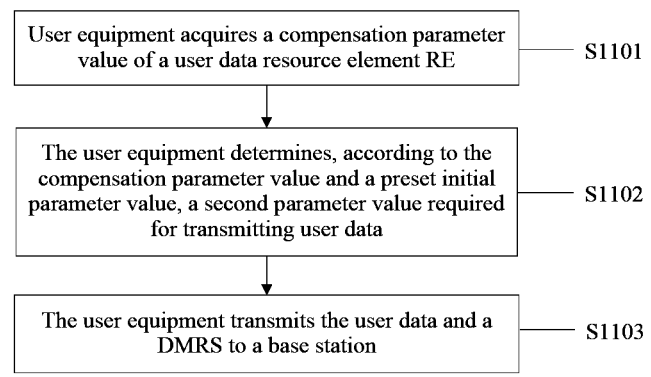
FIG. 11 is a schematic flowchart 11 of a transmission method according to an embodiment of the present invention.

The embodiment of the present invention provides a signal transmission method, as shown in FIG. 11, where the method includes:

S1101. User equipment acquires a compensation parameter value of a user data resource element RE.

The user data RE is used to carry user data.

The compensation parameter value of the user data RE acquired by the user equipment is the compensation parameter value of the user data RE that is transmitted by a base station and received by the user equipment, where the compensation parameter value of the user data RE is determined by the base station according to network configuration information of the base station, where the network configuration information includes one or more of a quantity of transmit and receive antennas, a transmission order, or a channel estimation algorithm of the user equipment.

Optionally, the compensation parameter value includes a power compensation value or an amplitude compensation value.

Specifically, the compensation parameter value of the user data RE is determined by a quantity $N_{RX}$ of transmit and receive antennas, a quantity $N_{Layer}$ of transmission layers, and a channel estimation algorithm, that is, offset=$f(N_{RX}, N_{Layer})$+$\xi$, where $\xi$ is an empirical value and is determined by factors such as a channel estimation algorithm.

Optionally, $f(N_{RX}, N_{Layer})$ has multiple forms, which are not limited in the embodiment of the present invention.

For example, $f(N_{RX}, N_{Layer})$=10 lg $(N_{RX}, N_{Layer})$, where the quantity $N_{RX}$ of transmit and receive antennas and the quantity $N_{Layer}$ of transmission layers are parameters scheduled by a base station side.

S1102. The user equipment determines, according to the compensation parameter value and a preset initial parameter value, a second parameter value required for transmitting user data.

After receiving the compensation parameter value of the user data RE that is transmitted by the base station, the user equipment determines, according to the preset initial parameter value and the compensation parameter value, the second parameter value required for transmitting the user data.

The preset initial parameter value is the same as an initial parameter value of the user data that is determined by the base station. The preset initial parameter value is the initial parameter value acquired automatically by the user equipment when the user equipment and the base station perform negotiation and the base station determines the initial parameter value of the user data.

It may be understood that the second parameter value is a parameter value used for actually transmitting a DMRS by the user equipment.

Optionally, the initial parameter value may be an initial power value or may be an initial amplitude value;

the compensation parameter value may be a power compensation value or may be an amplitude compensation value; the second parameter value may be a second power value or may be a second amplitude value.

S1103. The user equipment transmits the user data and a DMRS to a base station.

After determining the second parameter value for transmitting the user data, the user equipment transmits the DMRS and the user data to the base station, so that the base station obtains a DMRS RE channel estimation value according to the received DMRS after receiving the user data and the DMRS that are transmitted by the user equipment. Then the base station performs interpolation filtering on the DMRS RE channel according to the DMRS RE channel estimation value to obtain channel information of the user data RE, and further, the base station demodulates the user data according to the channel information of the user data RE and the user data that is transmitted by the user equipment by using the second parameter value and computed by the base station according to the compensation parameter value and the initial parameter value of the user data RE.

The user data transmitted by using the second parameter value is computed by the base station according to the compensation parameter value and the initial parameter value of the user data RE, the initial parameter value is determined by the base station according to the network configuration information of the base station, and the initial parameter value includes an initial power value or an initial amplitude value, where the network configuration information includes one or more of the quantity of transmit and receive antennas, the transmission order, or the channel estimation algorithm of the user equipment.

Optionally, the initial parameter value may be an initial power value or may be an initial amplitude value; the compensation parameter value may be a power compensation value or may be an amplitude compensation value; the second parameter value may be a second power value or may be a second amplitude value.

For example, $S_{data}$ represents an initial user data signal determined by the base station, $\Delta S_{data}$ represents a compensated user data signal, $h_1$ and $h_2$ respectively represent independent channels from the user equipment to a first antenna and a second antenna of the base station, $y_{1\_data}$ and $y_{2\_data}$ respectively represent received signals after the user data passes through the two channels, and $n_1$ and $n_2$ respectively represent noise superimposed on the two channels Therefore, user data detected by the base station is:

$$Y_{data} = \begin{bmatrix} y_{1\_data} \\ y_{2\_data} \end{bmatrix} = \begin{bmatrix} h_1(S_{data} + \Delta S_{data}) + n_1 \\ h_2(S_{data} + \Delta S_{data}) + n_2 \end{bmatrix}.$$

It can be found that, the user data received by the base station includes noise. The base station needs to obtain user $(S_{data}+\Delta S_{data})$ that is transmitted by using the second parameter value and channel information of the user, so that the base station can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and computes, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the computed user data transmitted by the user equipment by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 12

Figure 12:
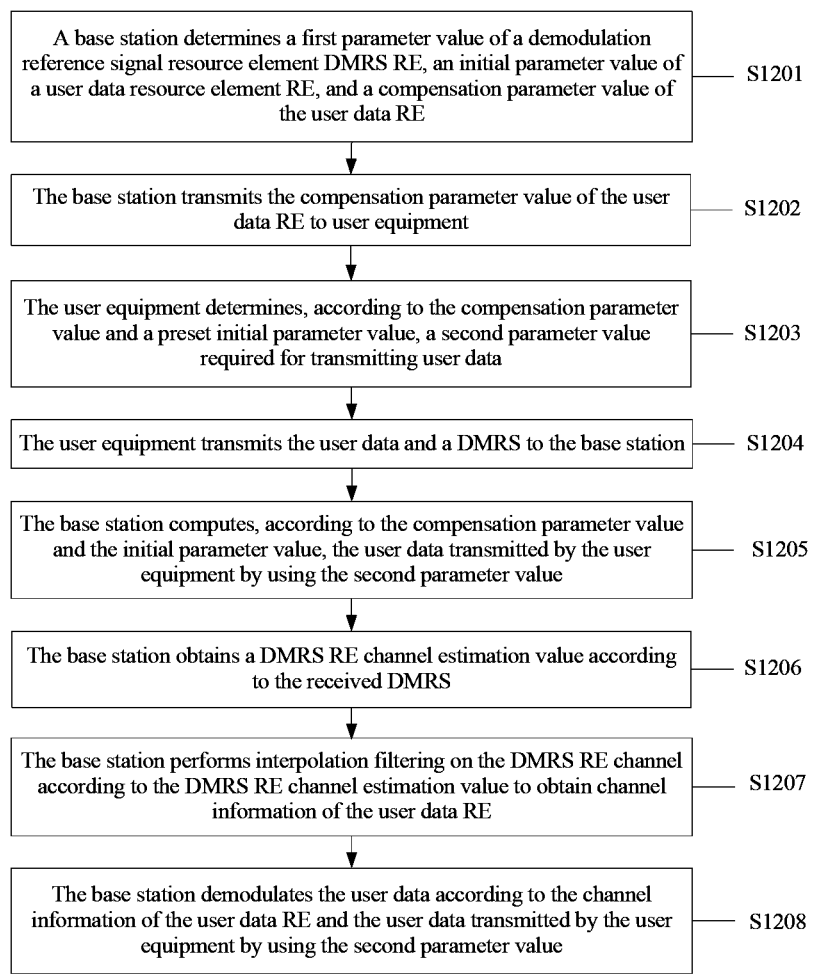
FIG. 12 is a schematic flowchart 12 of a transmission method according to an embodiment of the present invention.

The embodiment of the present invention provides a signal transmission method, as shown in FIG. 12, where the method includes:

S1201. A base station determines a first parameter value of a demodulation reference signal resource element DMRS RE, an initial parameter value of a user data resource element RE, and a compensation parameter value of the user data RE.

The base station determines the first parameter value of the DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of user equipment.

The user data RE is used to carry user data, the first parameter value is used to indicate that the user equipment transmits a DMRS by using the first parameter value, and the DMRS RE is used to carry the demodulation reference signal DMRS.

Optionally, the first parameter value may be a first power value or may be a first amplitude value; the initial parameter value may be an initial power value or may be an initial amplitude value; the compensation parameter value may be a power compensation value or may be an amplitude compensation value.

Specifically, the compensation parameter value of the user data RE is determined by a quantity $N_{RX}$ of transmit and receive antennas, a quantity $N_{Layer}$ of transmission layers, and a channel estimation algorithm, that is, offset=$f(N_{RX}, N_{Layer})+\xi$, where $\xi$ is an empirical value and is determined by factors such as a channel estimation algorithm.

Optionally, $f(N_{RX}, N_{Layer})$ has multiple forms, which are not limited in the embodiment of the present invention.

For example, $f(N_{RX}, N_{Layer})=10 \lg(N_{RX}, N_{Layer})$, where the quantity $N_{RX}$ of transmit and receive antennas and the quantity $N_{Layer}$ of transmission layers are parameters scheduled by a base station side.

S1202. The base station transmits the compensation parameter value of the user data RE to user equipment.

After determining the compensation parameter value of the user data RE, the base station transmits the compensation parameter value to the user equipment, so that the user equipment determines, according to the compensation parameter value and a preset initial parameter value, a second parameter value required for transmitting the user data.

The second parameter value is a parameter value that is required for transmitting the user data and determined by the user according to the compensation parameter value of the user data RE and the preset initial parameter value; the preset initial parameter value is obtained automatically by the user equipment after the base station determines the preset initial parameter value according to the network configuration information of the base station; the compensation parameter value is determined by the base station according to the network configuration information of the base station, where the network configuration information includes one or more of the quantity of transmit and receive antennas, the transmission order, or the channel estimation algorithm of the user equipment.

Optionally, the compensation parameter value may be a power compensation value or may be an amplitude compensation value; the initial parameter value may be an initial power value or may be an initial amplitude value; the second parameter value may be a second power value or may be a second amplitude value.

It may be understood that the second parameter value is a parameter value used for actually transmitting the user data by the user equipment.

Specifically, the base station adds the compensation parameter value of the user data RE to explicit signaling or higher layer signaling; if the DMRS is transmitted in a physical uplink shared channel PUSCH, the base station transmits the explicit signaling or higher layer signaling carrying the compensation parameter value of the user data RE to the user equipment by using a physical downlink control channel PDCCH, a physical broadcast channel PBCH, or a physical downlink shared channel PDSCH; if the DMRS is transmitted in a physical uplink control channel PUCCH, the base station transmits the explicit signaling or higher layer signaling carrying the compensation parameter value of the user data RE to the user equipment by using a physical broadcast channel PBCH or a physical downlink shared channel PDSCH.

It should be noted that, the explicit signaling or higher layer signaling is obtained by the base station according to the compensation parameter value of the DMRS RE by searching for a feature of an optimal compensation value element in a preset compensation parameter value element set, where the compensation parameter value element set is obtained after design by means of compensation parameter value quantization and the like, where the feature includes a subscript of the compensation value element.

Correspondingly, the compensation parameter value of the user data RE acquired by the user equipment is the compensation parameter value of the user data RE that is transmitted by the base station and received by the user equipment, where the compensation parameter value of the user data RE is determined by the base station according to the network configuration information of the base station, where the network configuration information includes one or more of the quantity of transmit and receive antennas, the transmission order, or the channel estimation algorithm of the user equipment.

Optionally, the compensation parameter value includes a power compensation value or an amplitude compensation value.

Specifically, if the DMRS is transmitted in a physical uplink shared channel PUSCH, the user equipment receives, by using a PDCCH, a PBCH, or a PDSCH, the explicit signaling or higher layer signaling carrying the compensation parameter value of the user data RE from the base station, where the explicit signaling or higher layer signaling carrying the compensation parameter value of the user data RE is transmitted after the base station adds the compensation parameter value of the user data RE to the explicit signaling or higher layer signaling; if the DMRS is transmitted in a physical uplink control channel PUCCH, the user equipment receives, by using a PBCH or a PDSCH, the explicit signaling or higher layer signaling carrying the compensation parameter value of the user data RE from the base station, where the explicit signaling or higher layer signaling carrying the compensation parameter value of the user data RE is transmitted after the base station adds the compensation parameter value of the user data RE to the explicit signaling or higher layer signaling.

S1203. The user equipment determines, according to the compensation parameter value and a preset initial parameter value, a second parameter value required for transmitting user data.

After receiving the compensation parameter value of the user data RE that is transmitted by the base station, the user equipment determines, according to the preset initial parameter value and the compensation parameter value, the second parameter value required for transmitting the user data.

The preset initial parameter value is the same as the initial parameter value of the user data that is determined by the base station. The preset initial parameter value is the initial parameter value acquired automatically by the user equipment when the user equipment and the base station perform negotiation and the base station determines the initial parameter value of the user data.

It may be understood that the second parameter value is a parameter value used for actually transmitting the DMRS by the user equipment.

Optionally, the initial parameter value may be an initial power value or may be an initial amplitude value; the compensation parameter value may be a power compensation value or may be an amplitude compensation value; the second parameter value may be a second power value or may be a second amplitude value.

For example, $S_{data}$ represents an initial user data signal determined by the base station, and $\Delta S_{data}$ represents a compensated user data signal. Therefore, the user equipment determines, according to the compensated user data signal $\Delta S_{data}$ and the preset initial user data signal $S_{data}$, the second parameter value ($S_{data}+\Delta S_{data}$) required for transmitting the user data.

S1204. The user equipment transmits the user data and a DMRS to the base station.

After determining the second parameter value for transmitting the user data, the user equipment transmits the DMRS and the user data to the base station.

Specifically, the user equipment processes the user data and the DMRS in a same precoding processing manner; if the DMRS is transmitted in a physical uplink shared channel PUSCH, the user equipment transmits the processed user data and DMRS to the base station by using the PUSCH, where the DMRS is transmitted by the user equipment by using the first parameter value, and the user data is transmitted by the user equipment by using the second parameter value; if the DMRS is transmitted in a physical uplink control channel PUCCH, the user equipment transmits the processed user data and DMRS to the base station by using the PUCCH, where the DMRS is transmitted by the user equipment by using the first parameter value, and the user data is transmitted by the user equipment by using the second parameter value.

Optionally, the first parameter value may be a first power value or may be a first amplitude value, and the second parameter value may be a second power value or may be a second amplitude value.

Correspondingly, the base station receives the user data and the DMRS transmitted by the user equipment, where the user data and the DMRS are transmitted by the user equipment after being processed in the same precoding processing manner.

Specifically, if the DMRS is transmitted in a physical uplink shared channel PUSCH, the base station receives the user data and the DMRS from the user equipment by using the PUSCH, where the user data and the DMRS are transmitted by the user equipment after being processed in the same precoding processing manner, the user data is transmitted by the user equipment by using the second parameter value, and the DMRS is transmitted by the user equipment by using the first parameter value; if the DMRS is transmitted in a physical uplink control channel PUCCH, the base station receives the user data and the DMRS from the user equipment by using the PUCCH, where the user data and the DMRS are transmitted by the user equipment after being processed in the same precoding processing manner, the user data is transmitted by the user equipment by using the second parameter value, and the DMRS is transmitted by the user equipment by using the first parameter value.

S1205. The base station computes, according to the compensation parameter value and the initial parameter value, the user data transmitted by the user equipment by using the second parameter value.

The second parameter value is the parameter value that is required for transmitting the user data and determined by the user according to the compensation parameter value of the user data RE and the preset initial parameter value; the compensation parameter value is determined by the base station according to the network configuration information of the base station; the preset initial parameter value is obtained automatically by the user equipment after the base station determines the preset initial parameter value according to the network configuration information of the base station, where the network configuration information includes one or more of the quantity of transmit and receive antennas, the transmission order, or the channel estimation algorithm of the user equipment.

Optionally, the compensation parameter value may be a power compensation value or may be an amplitude compensation value; the second parameter value may be a second power value or may be a second amplitude value; the initial parameter value may be an initial power value or may be an initial amplitude value.

To implement effective channel estimation, the base station needs to obtain the user data actually transmitted by the user equipment, that is, needs to obtain the user data transmitted by the user equipment by using the second parameter value.

Specifically, after the base station determines the compensation parameter value of the user data RE and the initial parameter value of the user data RE according to the network configuration information of the base station, the base station computes, according to the compensation parameter value and the initial parameter value, the user data transmitted by the user equipment by using the second parameter value.

For example, $S_{data}$ represents the initial user data signal determined by the base station, and $\Delta S_{data}$ represents the compensated user data signal. Therefore, the base station determines, according to the compensated user data signal $\Delta S_{data}$ and the initial user data signal $S_{data}$, the second parameter value ($S_{data}+\Delta S_{data}$) required for transmitting the user data.

S1206. The base station obtains a DMRS RE channel estimation value according to the received DMRS.

The base station may obtain the DMRS RE channel estimation value directly according to the DMRS after receiving the DMRS transmitted by the user equipment.

For example, there is a point-to-point communications model with one transmit antenna and two receive antennas, $S_{DMRS}$ represents a transmitted DMRS signal, $h_1$ and $h_2$ respectively represent independent channels from user equipment to a first antenna and a second antenna of a base station, $y_1$ and $y_2$ respectively represent DMRS signals received by the two receive antennas, and $n_1$ and $n_2$ respectively represent noise superimposed on the two channels Therefore, $$y_1 = h_1 S_{DMRS} + n_1;$$

$$y_2 = h_2 S_{DMRS} + n.$$

A DMRS RE channel estimation value obtained by using an LS estimation algorithm is:

$$\hat{h} = \begin{bmatrix} \hat{h}_1 \\ \hat{h}_2 \end{bmatrix} = \begin{bmatrix} y_1/S_{DMRS} \\ y_2/S_{DMRS} \end{bmatrix}.$$

S1207. The base station performs interpolation filtering on the DMRS RE channel according to the DMRS RE channel estimation value to obtain channel information of the user data RE.

The DMRS and user data that are transmitted by the user equipment to the base station are located in different resource elements of a same channel After obtaining the DMRS RE channel estimation value, the user equipment performs interpolation filtering on the DMRS RE channel according to the channel estimation value to obtain the channel information of the user data RE.

S1208. The base station demodulates the user data according to the channel information of the user data RE and the computed user data transmitted by the user equipment by using the second parameter value.

The second parameter value is the parameter value that is required for transmitting the user data and determined by the user equipment according to the preset initial parameter value and the compensation parameter value, and the initial parameter value is determined by the base station according to the network configuration information of the base station, where the network configuration information includes one or more of the quantity of transmit and receive antennas, the transmission order, or the channel estimation algorithm of the user equipment.

Optionally, the second parameter value may be a second power value or may be a second amplitude value.

For example, $S_{data}$ represents the initial user data signal determined by the base station, represents the compensated user data signal, $h_1$ and $h_2$ respectively represent independent channels from the user equipment to a first antenna and a second antenna of the base station, $y_{1\text{-}data}$ and $y_{2\text{-}data}$ respectively represent received signals after the user data passes through the two channels, and $n_1$ and $n_2$ respectively represent noise superimposed on the two channels Therefore, user data detected by the base station is:

$$Y_{data} = \begin{bmatrix} y_{1\_data} \\ y_{2\_data} \end{bmatrix} = \begin{bmatrix} h_1(S_{data} + \Delta S_{data}) + n_1 \\ h_2(S_{data} + \Delta S_{data}) + n_2 \end{bmatrix}.$$

It can be found that, the user data received by the base station includes noise. The base station needs to obtain user data ($S_{data}+\Delta S_{data}$) that is transmitted by using the second parameter value and channel information of the user data RE, so that the base station can accurately demodulate the user data.

The embodiment of the present invention provides a signal transmission method. A base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and obtains, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the user data that is transmitted by the user equipment by using the second parameter value and computed by the base station according to the compensation parameter value and the initial parameter value of the user data RE. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 13

Figure 13:
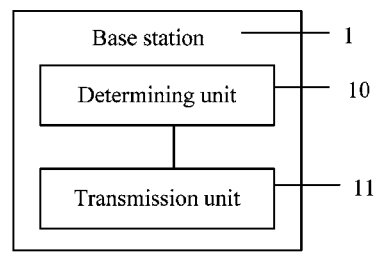
FIG. 13 is a schematic structural diagram 1 of a base station according to an embodiment of the present invention.

The present invention provides a base station 1, as shown in FIG. 13, including:

a determining unit 10, configured to determine a first parameter value of a user data resource element RE, an initial parameter value of a demodulation reference signal resource element DMRS RE, and a compensation parameter value of the DMRS RE, and determine, according to the initial parameter value and the compensation parameter value, a second parameter value required for transmitting the DMRS, where the user data RE is used to carry user data, the first parameter value is used to indicate that the base station transmits the user data by using the first parameter value, and the DMRS RE is used to carry the demodulation reference signal DMRS; and a transmission unit 11, configured to transmit the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE.

Further, the determining unit 10 is configured to determine the first parameter value of the user data RE, the initial parameter value of the DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

Further, the transmission unit 11 includes a processing module, where:

the processing module is configured to process the user data and the DMRS in a same precoding processing manner.

Further, the transmission unit 11 transmits the processed user data and DMRS to the user equipment by using a physical downlink shared channel PDSCH or an enhanced physical downlink control channel EPDCCH, and transmits the compensation parameter value of the DMRS RE to the user equipment by using a physical downlink control channel PDCCH or a physical broadcast channel PBCH.

The present invention provides a base station, mainly including a determining unit and a transmitting unit. The base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 14

Figure 14:
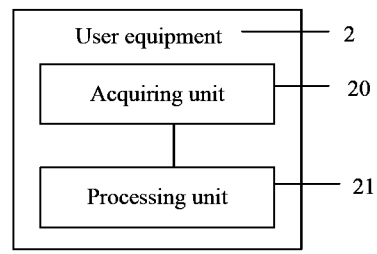
FIG. 14 is a schematic structural diagram 1 of user equipment according to an embodiment of the present invention.

The present invention provides user equipment 2, as shown in FIG. 14, including:

an acquiring unit 20, configured to acquire a compensation parameter value of a demodulation reference signal resource element DMRS RE, user data, and a demodulation reference signal DMRS, where the DMRS RE is used to carry the demodulation reference signal DMRS; and a processing unit 21, configured to compute, according to the compensation parameter value acquired by the acquiring unit 20 and a preset initial parameter value, the DMRS transmitted by a base station by using a second parameter value, obtain a DMRS RE channel estimation value according to the received DMRS and the computed DMRS transmitted by the base station by using the second parameter value, further perform interpolation filtering on the DMRS RE channel according to the DMRS RE channel estimation value to obtain channel information of a user data resource element RE, and finally demodulate the user data according to the channel information of the user data RE, where the second parameter value is a parameter value that is required for transmitting the DMRS and determined by the base station according to an initial parameter value of the DMRS RE and the compensation parameter value.

Further, the compensation parameter value acquired by the acquiring unit 20 is the compensation parameter value of the DMRS RE that is transmitted by the base station and received by the user equipment, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the user data acquired by the acquiring unit 20 is the user data that is transmitted by the base station by using a first parameter value of the user data resource element RE and received by the user equipment, where the user data RE is used to carry the user data, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the DMRS acquired by the acquiring unit 20 is the DMRS that is transmitted by the base station by using the second parameter value and received by the user equipment, where the second parameter value is the parameter value that is required for transmitting the DMRS and determined by the base station according to the initial parameter value of the DMRS and the compensation parameter value of the DMRS RE, and the second parameter value includes a second power value or a second amplitude value.

Further, the acquiring unit 20 receives the user data and the DMRS from the base station by using a PDSCH or an EPDCCH, where the user data and the DMRS are transmitted by the base station after being processed in a same precoding processing manner.

The present invention provides user equipment, mainly including an acquiring unit and a processing unit. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment obtains, according to the compensation parameter value and a preset initial parameter value, the DMRS transmitted by the base station by using the second parameter value, and that the user equipment obtains a DMRS RE channel estimation value according to the received DMRS and the DMRS transmitted by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 15

Figure 15:
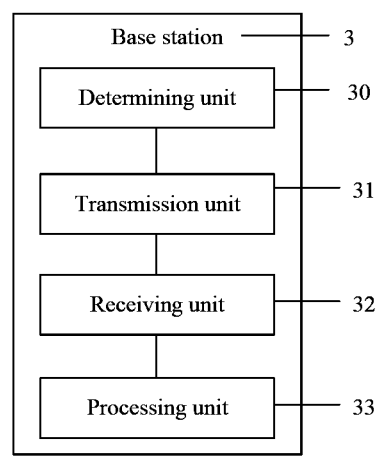
FIG. 15 is a schematic structural diagram 2 of a base station according to an embodiment of the present invention.

The present invention provides a base station 3, as shown in FIG. 15, including:

a determining unit 30, configured to determine a first parameter value of a user data resource element RE, an initial parameter value of a demodulation reference signal resource element DMRS RE, and a compensation parameter value of the DMRS RE, where the user data RE is used to carry user data, the first power value is used to indicate that the user equipment transmits the user data by using the first parameter value, and the DMRS RE is used to carry a demodulation reference signal DMRS;

a transmission unit 31, configured to transmit the compensation parameter value determined by the determining unit 30 to the user equipment, so that the user equipment determines, according to the compensation parameter value and a preset initial parameter value, a second parameter value required for transmitting the DMRS;

a receiving unit 32, configured to receive the user data and the DMRS transmitted by the user equipment; and a processing unit 33, configured to compute, according to the compensation parameter value determined by the determining unit 30 and the initial parameter value determined by the determining unit 30, the DMRS transmitted by the user equipment by using the second parameter value, and configured to obtain a DMRS RE channel estimation value according to the DMRS received by the receiving unit 32 and the computed DMRS transmitted by the user equipment by using the second parameter value, and further perform interpolation filtering on the DMRS RE channel according to the DMRS RE channel estimation value to obtain channel information of the user data, and finally demodulate the user data according to the channel information of the user data.

Further, the determining unit 30 determines the first parameter value of the user data RE, the initial parameter value of the demodulation reference signal resource element DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value or a first amplitude value, the initial parameter value includes an initial power value or an initial amplitude value, and the compensation parameter value includes a power compensation value or an amplitude compensation value.

Further, the receiving unit 32 is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the DMRS is transmitted by the user equipment by using the second parameter value, and the user data is transmitted by the user equipment by using the first parameter value; and configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the DMRS is transmitted by the user equipment by using the second parameter value, and the user data is transmitted by the user equipment by using the first parameter value.

The present invention provides a base station, mainly including a determining unit, a transmitting unit, a receiving unit, and a processing unit. The base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, and further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 16

Figure 16:
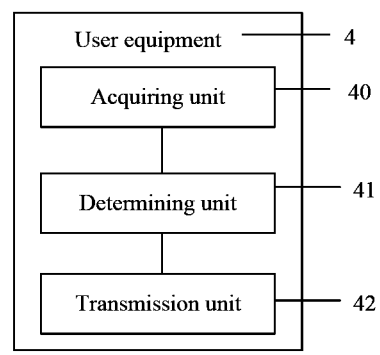
FIG. 16 is a schematic structural diagram 2 of user equipment according to an embodiment of the present invention.

The present invention provides user equipment 4, as shown in FIG. 16, including:

an acquiring unit 40, configured to acquire a compensation parameter value of a demodulation reference signal resource element DMRS RE, where the DMRS RE is used to carry a demodulation reference signal DMRS;

a determining unit 41, configured to determine, according to the compensation parameter value acquired by the acquiring unit 40 and a preset initial parameter value, a second parameter value required for transmitting the DMRS; and a transmission unit 42, configured to transmit user data and the DMRS to a base station, so that the base station obtains a DMRS RE channel estimation value according to the received DMRS and the DMRS that is transmitted by the user equipment by using the second parameter value and computed by the base station according to the compensation parameter value and an initial parameter value of the DMRS RE, and the base station performs interpolation filtering on the DMRS RE channel estimation value to obtain channel information of a user data RE, and further the base station demodulates the user data according to the channel information of the user data RE.

Further, the compensation parameter value of the DMRS RE acquired by the acquiring unit 40 is the compensation parameter value of the DMRS RE that is transmitted by the base station and received by the user equipment, where the compensation parameter value of the DMRS RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

Further, the transmission unit 42 includes a processing module, where:

the processing module is configured to process the user data and the DMRS in a same precoding processing manner.

Further, the transmission unit 42 is specifically configured to transmit, if the DMRS is transmitted in a physical uplink shared channel PUSCH, the processed user data and DMRS to the base station by using the PUSCH, where the DMRS is transmitted by the user equipment by using the second parameter value, the user data is transmitted by the user equipment by using the first parameter value, the first parameter value includes a first power value, and the second parameter value includes a second power value, or the first parameter value includes a first amplitude value, and the second parameter value includes a second amplitude value; and configured to transmit, if the DMRS is transmitted in a physical uplink control channel PUCCH, the processed user data and DMRS to the base station by using the PUCCH, where the DMRS is transmitted by the user equipment by using the second parameter value, the user data is transmitted by the user equipment by using the first parameter value, the first parameter value includes the first power value, and the second parameter value includes the second power value, or the first parameter value includes the first amplitude value, and the second parameter value includes the second amplitude value.

The present invention provides user equipment, mainly including a receiving unit, a determining unit, and a transmitting unit. A base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, and further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 17

Figure 17:
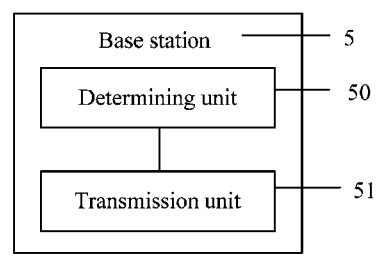
FIG. 17 is a schematic structural diagram 3 of a base station according to an embodiment of the present invention.

The present invention provides a base station 5, as shown in FIG. 17, including:

a determining unit 50, configured to determine a first parameter value of a demodulation reference signal resource element DMRS RE, an initial parameter value of a user data resource element RE, and a compensation parameter value of the user data RE, and determine, according to the initial parameter value and the compensation parameter value, a second parameter value required for transmitting the user data, where the user data RE is used to carry the user data, the first parameter value is used to indicate that the base station transmits the DMRS by using the first parameter value, and the DMRS RE is used to carry the demodulation reference signal DMRS; and a transmission unit 51, configured to transmit the DMRS, the user data, and the compensation parameter value to user equipment, so that the user equipment computes, according to the compensation parameter value and a preset initial parameter value, the user data transmitted by the base station by using the second parameter value, and the user equipment obtains a DMRS RE channel estimation value according to the received DMRS, and that the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value.

Further, the determining unit 50 determines the first parameter value of the demodulation reference signal resource element DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value or a first amplitude value, the initial parameter value includes an initial power value or an initial amplitude value, and the compensation parameter value includes a power compensation value or an amplitude compensation value.

Further, the transmission unit 51 further includes a processing module, where:

the processing module is configured to process the user data and the DMRS in a same precoding processing manner; and the transmission unit 51 is specifically configured to transmit the processed user data and DMRS to the user equipment by using a physical downlink shared channel PDSCH or an enhanced physical downlink control channel EPDCCH.

The present invention provides a base station, mainly including a determining unit and a transmitting unit. The base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 18

Figure 18:
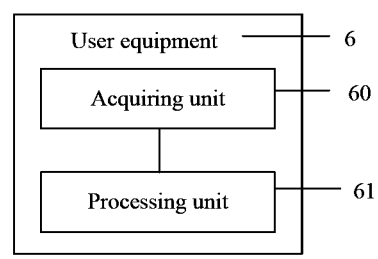
FIG. 18 is a schematic structural diagram 3 of user equipment according to an embodiment of the present invention.

The present invention provides user equipment 6, as shown in FIG. 18, including:

an acquiring unit 60, configured to acquire a demodulation reference signal DMRS, user data, and a compensation parameter value of a user data resource element RE, where the user data RE is used to carry the user data; and a processing unit 61, configured to compute, according to the compensation parameter value acquired by the acquiring unit 60 and a preset initial parameter value, the user data transmitted by a base station by using a second parameter value, and obtain a DMRS RE channel estimation value according to the received DMRS, and configured to perform interpolation filtering on the DMRS RE channel according to the DMRS RE channel estimation value to obtain channel information of the user data RE, and further configured to demodulate the user data according to the channel information of the user data RE and the computed user data transmitted by the base station by using the second parameter value, where the second parameter value is a parameter value that is required for transmitting the user data and determined by the base station according to an initial parameter value of the user data RE and the compensation parameter value.

Further, the compensation parameter value acquired by the acquiring unit 60 is the received compensation parameter value of the user data RE that is transmitted by the base station, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the DMRS acquired by the acquiring unit 60 is the received DMRS that is transmitted by the base station by using a first parameter value of a demodulation reference signal resource element DMRS RE, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the acquiring unit 60 is the received user data that is transmitted by the base station by using the second parameter value, where the second parameter value is the parameter value that is required for transmitting the user data and determined by the base station according to the initial parameter value of the user data RE and the compensation parameter value of the user data RE, and the second parameter value includes a second power value or a second amplitude value.

Further, the acquiring unit 60 is specifically configured to receive the user data and the DMRS from the base station by using a PDSCH or an EPDCCH, where the user data and the DMRS are transmitted by the base station after being processed in a same precoding processing manner.

The present invention provides user equipment, mainly including an acquiring unit and a processing unit. A base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to the user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 19

Figure 19:
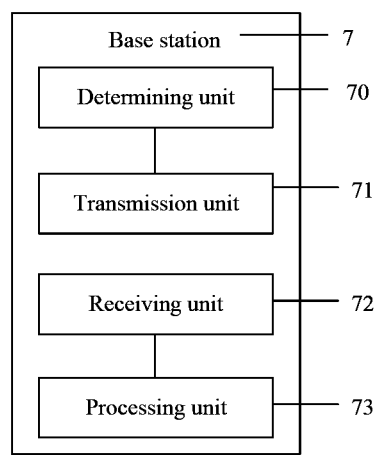
FIG. 19 is a schematic structural diagram 4 of a base station according to an embodiment of the present invention.

The present invention provides a base station 7, as shown in FIG. 19, including:

a determining unit 70, configured to determine a first parameter value of a demodulation reference signal resource element DMRS RE, an initial parameter value of a user data resource element RE, and a compensation parameter value of the user data RE, where the user data RE is used to carry user data, the first parameter value is used to indicate that the user equipment transmits the DMRS by using the first parameter value, and the DMRS RE is used to carry the demodulation reference signal DMRS;

a transmission unit 71, configured to transmit the compensation parameter value determined by the determining unit 70 to the user equipment, so that the user equipment determines, according to the compensation parameter value and a preset initial parameter value, a second parameter value required for transmitting the user data;

a receiving unit 72, configured to receive the user data and the DMRS transmitted by the user equipment; and a processing unit 73, configured to compute, according to the compensation parameter value and the initial parameter value that are determined by the determining unit 70, the user data transmitted by the user equipment by using the second parameter value, and configured to obtain a DMRS RE channel estimation value according to the received DMRS, and further configured to perform interpolation filtering on the DMRS RE channel according to the DMRS RE channel estimation value to obtain channel information of the user data RE, and further configured to demodulate the user data according to the channel information of the user data RE and the computed user data transmitted by the user equipment by using the second parameter value.

Further, the determining unit 70 is specifically configured to determine the first parameter value of the DMRS RE, the initial parameter value of the user data RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

Further, the receiving unit 72 is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the user data is transmitted by the user equipment by using the second parameter value, and the DMRS is transmitted by the user equipment by using the first parameter value; and specifically configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the user data is transmitted by the user equipment by using the second parameter value, and the DMRS is transmitted by the user equipment by using the first parameter value.

The present invention provides a base station, mainly including a determining unit, a transmitting unit, a receiving unit, and a processing unit. The base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and obtains, by using computation according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the data RE and the user data transmitted by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 20

Figure 20:
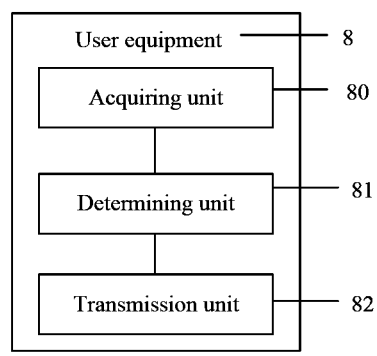
FIG. 20 is a schematic structural diagram 4 of user equipment according to an embodiment of the present invention.

The present invention provides user equipment 8, as shown in FIG. 20, including:

an acquiring unit 80, configured to acquire a compensation parameter value of a user data resource element RE, where the user data RE is used to carry user data;

a determining unit 81, configured to determine, according to the compensation parameter value acquired by the acquiring unit 80 and a preset initial parameter value, a second parameter value required for transmitting the user data; and a transmission unit 82, configured to transmit the user data and the DMRS to a base station, so that the base station obtains a DMRS RE channel estimation value according to the received DMRS, and the base station performs interpolation filtering on the DMRS RE channel according to the DMRS RE channel estimation value to obtain channel information of the user data RE, and further the base station demodulates the user data according to the channel information of the user data RE and the user data that is transmitted by the user equipment by using the second parameter value and computed by the base station according to the compensation parameter value and an initial parameter value of the user data RE.

Further, the compensation parameter value of the user data RE acquired by the acquiring unit 80 is the compensation parameter value of the user data RE that is transmitted by the base station and received by the user equipment, where the compensation parameter value of the user data RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

Further, the transmission unit 82 further includes a processing module, where:

the processing module is configured to process the user data and the DMRS in a same precoding processing manner.

Further, the transmission unit 82 is specifically configured to transmit, if the DMRS is transmitted in a physical uplink shared channel PUSCH, the processed user data and DMRS to the base station by using the PUSCH, where the DMRS is transmitted by the user equipment by using a first parameter value, the user data is transmitted by the user equipment by using the second parameter value, the first parameter value includes a first power value, and the second parameter value includes a second power value, or the first parameter value includes a first amplitude value, and the second parameter value includes a second amplitude value; and specifically further configured to transmit, if the DMRS is transmitted in a physical uplink control channel PUCCH, the processed user data and DMRS to the base station by using the PUCCH, where the DMRS is transmitted by the user equipment by using the first parameter value, the user data is transmitted by the user equipment by using the second parameter value, the first parameter value includes the first power value, and the second parameter value includes the second power value, or the first parameter value includes the first amplitude value, and the second parameter value includes the second amplitude value.

The present invention provides user equipment, mainly including a receiving and acquiring unit, a determining unit, and a transmitting unit. A base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and computes, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the computed user data transmitted by the user equipment by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 21

Figure 21:
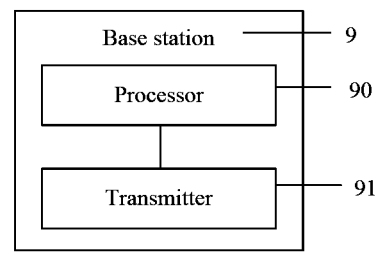
FIG. 21 is a schematic structural diagram 5 of a base station according to an embodiment of the present invention.

The present invention provides a base station 9, as shown in FIG. 21, including:

a processor 90, configured to determine a first parameter value of a user data resource element RE, an initial parameter value of a demodulation reference signal resource element DMRS RE, and a compensation parameter value of the DMRS RE, and determine, according to the initial parameter value and the compensation parameter value, a second parameter value required for transmitting the DMRS, where the user data RE is used to carry user data, the first parameter value is used to indicate that the base station transmits the user data by using the first parameter value, and the DMRS RE is used to carry the demodulation reference signal DMRS; and a transmitter 91, configured to transmit the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE.

Further, the processor 90 is configured to determine the first parameter value of the user data RE, the initial parameter value of the DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value or a first amplitude value, the initial parameter value includes an initial power value or an initial amplitude value, and the compensation parameter value includes a power compensation value or an amplitude compensation value, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

Further, the processor 90 is configured to process the user data and the DMRS in a same precoding processing manner.

Further, the transmitter 91 transmits the processed user data and DMRS to the user equipment by using a physical downlink shared channel PDSCH or an enhanced physical downlink control channel EPDCCH, and transmits the compensation parameter value of the DMRS RE to the user equipment by using a physical downlink control channel PDCCH or a physical broadcast channel PBCH.

The present invention provides a base station, mainly including a processor and a transmitter. The base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 22

Figure 22:
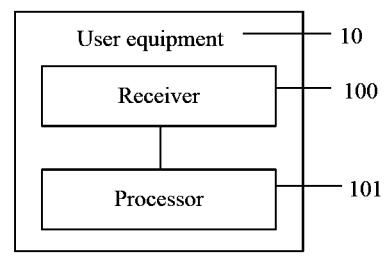
FIG. 22 is a schematic structural diagram 5 of user equipment according to an embodiment of the present invention.

The present invention provides user equipment 10, as shown in FIG. 22, including:

a receiver 100, configured to acquire a compensation parameter value of a demodulation reference signal resource element DMRS RE, user data, and a demodulation reference signal DMRS, where the DMRS RE is used to carry the demodulation reference signal DMRS; and a processor 101, configured to compute, according to the compensation parameter value acquired by the receiver 100 and a preset initial parameter value, the DMRS transmitted by a base station by using a second parameter value, obtain a DMRS RE channel estimation value according to the received DMRS and the computed DMRS transmitted by the base station by using the second parameter value, further perform interpolation filtering on the DMRS RE channel according to the DMRS RE channel estimation value to obtain channel information of a user data resource element RE, and finally demodulate the user data according to the channel information of the user data RE, where the second parameter value is a parameter value that is required for transmitting the DMRS and determined by the base station according to an initial parameter value of the DMRS RE and the compensation parameter value.

Further, the compensation parameter value acquired by the receiver 100 is the compensation parameter value of the DMRS RE that is transmitted by the base station and received by the user equipment, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the user data acquired by the receiver 100 is the user data that is transmitted by the base station by using a first parameter value of the user data resource element RE and received by the user equipment, where the user data RE is used to carry the user data, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the DMRS acquired by the receiver 100 is the DMRS that is transmitted by the base station by using the second parameter value and received by the user equipment, where the second parameter value is the parameter value that is required for transmitting the DMRS and determined by the base station according to the initial parameter value of the DMRS and the compensation parameter value of the DMRS RE, and the second parameter value includes a second power value or a second amplitude value.

Further, the receiver 100 receives the user data and the DMRS from the base station by using a PDSCH or an EPDCCH, where the user data and the DMRS are transmitted by the base station after being processed in a same precoding processing manner.

The present invention provides user equipment, mainly including a receiver and a processor. A base station determines a first parameter value of a user data resource element RE, an initial parameter value of a demodulation reference signal resource element DMRS RE, and a compensation parameter value of the DMRS RE, where the user data RE is used to carry user data, the first parameter value is used to indicate that the base station transmits the user data by using the first parameter value, and the DMRS RE is used to carry a demodulation reference signal DMRS; then determines, according to the initial parameter value and the compensation parameter value, a second parameter value required for transmitting the DMRS; and finally transmits the DMRS, the user data, and the compensation parameter value to user equipment, so that the user equipment computes, according to the compensation parameter value and a preset initial parameter value, the DMRS transmitted by the base station by using the second parameter value, and that the user equipment obtains a DMRS RE channel estimation value according to the received DMRS and the computed DMRS transmitted by the base station by using the second parameter value, and the user equipment performs interpolation filtering on the DMRS RE channel estimation value to obtain channel information of the user data RE, and further the user equipment demodulates the user data according to the channel information of the user data RE. In this solution, because the user equipment can receive the compensation parameter value transmitted by the base station, the user equipment can ensure accuracy of channel estimation of the user equipment, a resource waste problem of user data resource elements is resolved effectively, and system power utilization is improved.

Embodiment 23

Figure 23:
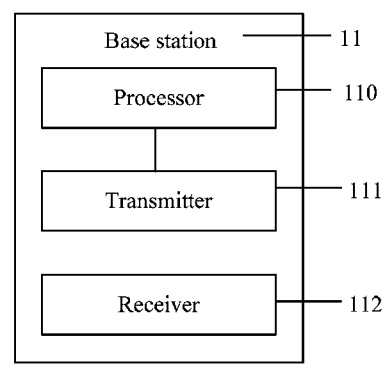
FIG. 23 is a schematic structural diagram 6 of a base station according to an embodiment of the present invention.

The present invention provides a base station 11, as shown in FIG. 23, including:

a processor 110, configured to determine a first parameter value of a user data resource element RE, an initial parameter value of a demodulation reference signal resource element DMRS RE, and a compensation parameter value of the DMRS RE, where the user data RE is used to carry user data, the first power value is used to indicate that user equipment transmits the user data by using the first parameter value, and the DMRS RE is used to carry a demodulation reference signal DMRS; and configured to compute, according to the compensation parameter value and the initial parameter value, the DMRS transmitted by the user equipment by using a second parameter value, and obtain a DMRS RE channel estimation value according to the received DMRS and the computed DMRS transmitted by the user equipment by using the second parameter value, further perform interpolation filtering on the DMRS RE channel according to the DMRS RE channel estimation value to obtain channel information of the user data RE, and finally demodulate the user data according to the channel information of the user data RE;

a transmitter 111, configured to transmit the compensation parameter value to the user equipment, so that the user equipment determines, according to the compensation parameter value and a preset initial parameter value, the second parameter value required for transmitting the DMRS; and a receiver 112, configured to receive the user data and the DMRS transmitted by the user equipment.

Further, the processor 110 determines the first parameter value of the user data RE, the initial parameter value of the demodulation reference signal resource element DMRS RE, and the compensation parameter value of the DMRS RE according to network configuration information of the base station, where the network configuration information includes one or more of a quantity of transmit and receive antennas, a transmission order, or a channel estimation algorithm of the user equipment, the first parameter value includes a first power value or a first amplitude value, the initial parameter value includes an initial power value or an initial amplitude value, and the compensation parameter value includes a power compensation value or an amplitude compensation value.

Further, the receiver 112 is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the DMRS is transmitted by the user equipment by using the second parameter value, and the user data is transmitted by the user equipment by using the first parameter value; and configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the DMRS is transmitted by the user equipment by using the second parameter value, and the user data is transmitted by the user equipment by using the first parameter value.

The present invention provides a base station, mainly including a processor, a transmitter, and a receiver. The base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and computes, according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, and further performs interpolation filtering on the DMRS RE channel according to the DMRS RE channel estimation value to obtain channel information of the user data RE, and demodulates the user data according to the channel information of the user data RE. This solution can ensure accuracy of channel estimation of the base station, effectively resolve a resource waste problem of user data resource elements, and improve system power utilization.

Embodiment 24

Figure 24:
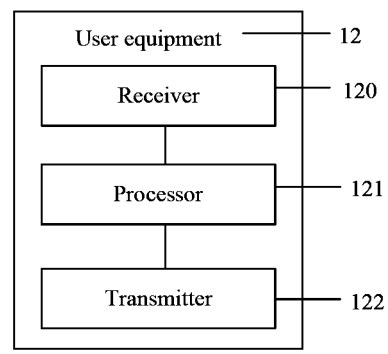
FIG. 24 is a schematic structural diagram 6 of user equipment according to an embodiment of the present invention.

The present invention provides user equipment 12, as shown in FIG. 24, including:

a receiver 120, configured to acquire a compensation parameter value of a demodulation reference signal resource element DMRS RE, where the DMRS RE is used to carry a demodulation reference signal DMRS;

a processor 121, configured to determine, according to the compensation parameter value acquired by the receiver 120 and a preset initial parameter value, a second parameter value required for transmitting the DMRS; and a transmitter 122, configured to transmit user data and the DMRS to a base station, so that the base station obtains a DMRS RE channel estimation value according to the received DMRS and the DMRS that is transmitted by the user equipment by using the second parameter value and computed by the base station according to the compensation parameter value and an initial parameter value of the DMRS RE, and the base station performs interpolation filtering on the DMRS RE channel estimation value to obtain channel information of a user data RE, and further the base station demodulates the user data according to the channel information of the user data RE.

Further, the compensation parameter value of the DMRS RE acquired by the receiver 120 is the compensation parameter value of the DMRS RE that is transmitted by the base station and received by the user equipment, where the compensation parameter value of the DMRS RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

Further, the processor 121 is configured to process the user data and the DMRS in a same precoding processing manner.

Further, the transmitter 122 is specifically configured to transmit, if the DMRS is transmitted in a physical uplink shared channel PUSCH, the processed user data and DMRS to the base station by using the PUSCH, where the DMRS is transmitted by the user equipment by using the second parameter value, the user data is transmitted by the user equipment by using the first parameter value, the first parameter value includes a first power value, and the second parameter value includes a second power value, or the first parameter value includes a first amplitude value, and the second parameter value includes a second amplitude value; and configured to transmit, if the DMRS is transmitted in a physical uplink control channel PUCCH, the processed user data and DMRS to the base station by using the PUCCH, where the DMRS is transmitted by the user equipment by using the second parameter value, the user data is transmitted by the user equipment by using the first parameter value, the first parameter value includes the first power value, and the second parameter value includes the second power value, or the first parameter value includes the first amplitude value, and the second parameter value includes the second amplitude value.

The present invention provides user equipment, mainly including a receiver, a processor, and a transmitter. A base station determines a first parameter value of a user data resource element RE, an initial parameter value of a demodulation reference signal resource element DMRS RE, and a compensation parameter value of the DMRS RE, and transmits the compensation parameter value to user equipment, so that the user equipment determines, according to the compensation parameter value and a preset initial parameter value, a second parameter value required for transmitting a DMRS, where the user data RE is used to carry user data, the first parameter value is used to indicate that the user equipment transmits the user data by using the first parameter value, and the DMRS RE is used to carry the demodulation reference signal DMRS; then receives the user data and DMRS that are transmitted by the user equipment, and obtains, by using computation according to the compensation parameter value and the initial parameter value, the DMRS transmitted by the user equipment by using the second parameter value; and finally obtains a DMRS RE channel estimation value according to the received DMRS and the computed DMRS transmitted by the user equipment by using the second parameter value, and further performs interpolation filtering on the DMRS RE channel according to the DMRS RE channel estimation value to obtain channel information of the user data, and demodulates the user data according to the channel information of the user data. This solution can ensure accuracy of channel estimation of the base station, effectively resolve a resource waste problem of user data resource elements, and improve system power utilization.

Embodiment 25

Figure 25:
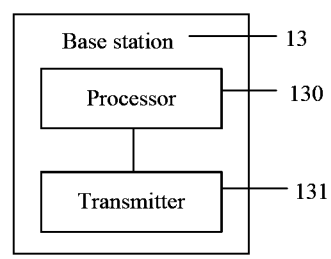
FIG. 25 is a schematic structural diagram 7 of a base station according to an embodiment of the present invention.

The present invention provides a base station 13, as shown in FIG. 25, including:
a processor 130, configured to determine a first parameter value of a demodulation reference signal resource element DMRS RE, an initial parameter value of a user data resource element RE, and a compensation parameter value of the user data RE, and determine, according to the initial parameter value and the compensation parameter value, a second parameter value required for transmitting the user data, where the user data RE is used to carry the user data, the first parameter value is used to indicate that the base station transmits the DMRS by using the first parameter value, and the DMRS RE is used to carry the demodulation reference signal DMRS; and
a transmitter 131, configured to transmit the DMRS, the user data, and the compensation parameter value to user equipment, so that the user equipment computes, according to the compensation parameter value and a preset initial parameter value, the user data transmitted by the base station by using the second parameter value, and the user equipment obtains a DMRS RE channel estimation value according to the received DMRS, and that the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value.

Further, the processor 130 determines the first parameter value of the demodulation reference signal resource element DMRS RE, the initial parameter value of the user data resource element RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value or a first amplitude value, the initial parameter value includes an initial power value or an initial amplitude value, and the compensation parameter value includes a power compensation value or an amplitude compensation value.

Further, the processor 130 is configured to process the user data and the DMRS in a same precoding processing manner; and
the transmitter 131 is specifically configured to transmit the processed user data and DMRS to the user equipment by using a physical downlink shared channel PDSCH or an enhanced physical downlink control channel EPDCCH.

The present invention provides a base station, mainly including a processor and a transmitter. The base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 26

Figure 26:
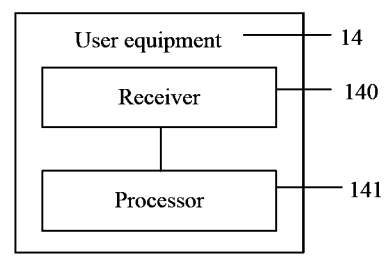
FIG. 26 is a schematic structural diagram 7 of user equipment according to an embodiment of the present invention.

The present invention provides user equipment 14, as shown in FIG. 26, including:
a receiver 140, configured to acquire a demodulation reference signal DMRS, user data, and a compensation parameter value of a user data resource element RE, where the user data RE is used to carry the user data; and
a processor 141, configured to compute, according to the compensation parameter value received by the receiver 140 and a preset initial parameter value, the user data transmitted by a base station by using a second parameter value, and obtain a DMRS RE channel estimation value according to the received DMRS, and configured to perform interpolation filtering on the DMRS RE channel according to the DMRS RE channel estimation value to obtain channel information of the user data RE, and further configured to demodulate the user data according to the channel information of the user data RE and the computed user data transmitted by the base station by using the second parameter value, where the second parameter value is a parameter value that is required for transmitting the user data and determined by the base station according to an initial parameter value of the user data RE and the compensation parameter value.

Further, the compensation parameter value acquired by the receiver 140 is the received compensation parameter value of the user data RE that is transmitted by the base station, where the compensation parameter value is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value;

the DMRS acquired by the receiver 140 is the received DMRS that is transmitted by the base station by using a first parameter value of a demodulation reference signal resource element DMRS RE, where the DMRS RE is used to carry the demodulation reference signal DMRS, the first parameter value is determined by the base station according to the network configuration information of the base station, the first parameter value includes a first power value or a first amplitude value, and the network configuration information includes one or more of the quantity of transmit and receive antennas, the transmission order, or the channel estimation algorithm of the user equipment; and the user data acquired by the receiver 140 is the received user data that is transmitted by the base station by using the second parameter value, where the second parameter value is the parameter value that is required for transmitting the user data and determined by the base station according to the initial parameter value of the user data RE and the compensation parameter value of the user data RE, and the second parameter value includes a second power value or a second amplitude value.

Further, the receiver 140 receives the user data and the DMRS from the base station by using a PDSCH or an EPDCCH, where the user data and the DMRS are transmitted by the base station after being processed in a same precoding processing manner.

The present invention provides user equipment, mainly including a receiver and a processor. A base station determines a first parameter value of a demodulation reference signal resource element DMRS RE, an initial parameter value of a user data resource element RE, and a compensation parameter value of the user data RE, where the user data RE is used to carry user data, the first parameter value is used to indicate that the base station transmits a DMRS by using the first parameter value, and the DMRS RE is used to carry the demodulation reference signal DMRS; then determines, according to the initial parameter value and the compensation parameter value, a second parameter value required for transmitting the user data; and finally transmits the DMRS, the user data, and the compensation parameter value to the user equipment, so that the user equipment computes, according to the compensation parameter value and a preset initial parameter value, the user data transmitted by the base station by using the second parameter value, and that the user equipment obtains a DMRS RE channel estimation value according to the received DMRS, and the user equipment performs interpolation filtering on the DMRS RE channel estimation value to obtain channel information of the user data RE, and further the user equipment demodulates the user data according to the channel information of the user data RE and the computed user data transmitted by the base station by using the second parameter value. In this solution, because the user equipment can receive the compensation parameter value transmitted by the base station, the user equipment can ensure accuracy of user data demodulated by the user equipment, a resource waste problem of user data resource elements is resolved effectively, and system power utilization is improved.

Embodiment 27

Figure 27:
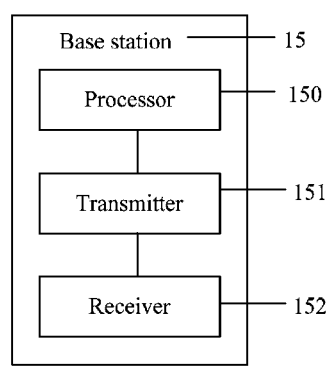
FIG. 27 is a schematic structural diagram 8 of a base station according to an embodiment of the present invention.

The present invention provides a base station 15, as shown in FIG. 27, including:

a processor 150, configured to determine a first parameter value of a demodulation reference signal resource element DMRS RE, an initial parameter value of a user data resource element RE, and a compensation parameter value of the user data RE, where the user data RE is used to carry user data, the first parameter value is used to indicate that the user equipment transmits the DMRS by using the first parameter value, and the DMRS RE is used to carry the demodulation reference signal DMRS, and configured to compute, according to the compensation parameter value and the initial parameter value, the user data transmitted by the user equipment by using a second parameter value, obtain a DMRS RE channel estimation value according to the received DMRS, so that the processor performs interpolation filtering on the DMRS RE channel according to the DMRS RE channel estimation value to obtain channel information of the user data RE, and finally demodulate the user data according to the channel information of the user data RE and the computed user data transmitted by the user equipment by using the second parameter value;

a transmitter 151, configured to transmit the compensation parameter value to the user equipment, so that the user equipment determines, according to the compensation parameter value and a preset initial parameter value, the second parameter value required for transmitting the user data; and a receiver 152, configured to receive the user data and the DMRS transmitted by the user equipment.

Further, the processor 150 determines the first parameter value of the DMRS RE, the initial parameter value of the user data RE, and the compensation parameter value of the user data RE according to network configuration information of the base station, where the network configuration information includes one or more of a quantity of transmit and receive antennas, a transmission order, or a channel estimation algorithm of the user equipment, the first parameter value includes a first power value, the initial parameter value includes an initial power value, and the compensation parameter value includes a power compensation value, or the first parameter value includes a first amplitude value, the initial parameter value includes an initial amplitude value, and the compensation parameter value includes an amplitude compensation value.

Further, the receiver 152 is specifically configured to receive, if the DMRS is transmitted in a physical uplink shared channel PUSCH, the user data and the DMRS from the user equipment by using the PUSCH, where the user data and the DMRS are transmitted by the user equipment after being processed in a same precoding processing manner, the user data is transmitted by the user equipment by using the second parameter value, and the DMRS is transmitted by the user equipment by using the first parameter value; and specifically configured to receive, if the DMRS is transmitted in a physical uplink control channel PUCCH, the user data and the DMRS from the user equipment by using the PUCCH, where the user data and the DMRS are transmitted by the user equipment after being processed in a same precoding processing manner, the user data is transmitted by the user equipment by using the second parameter value, and the DMRS is transmitted by the user equipment by using the first parameter value.

The present invention provides a base station, mainly including a processor, a transmitter, and a receiver. The base station determines a first parameter value of a demodulation reference signal resource element DMRS RE, an initial parameter value of a user data resource element RE, and a compensation parameter value of the user data RE, and transmits the compensation parameter value to user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and computes, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the computed user data transmitted by the user equipment by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

Embodiment 28

Figure 28:
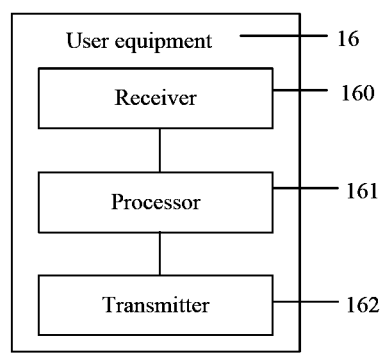
FIG. 28 is a schematic structural diagram 8 of user equipment according to an embodiment of the present invention.

The present invention provides user equipment 16, as shown in FIG. 28, including:

a receiver 160, configured to acquire a compensation parameter value of a user data resource element RE, where the user data RE is used to carry user data;

a processor 161, configured to determine, according to the compensation parameter value and a preset initial parameter value, a second parameter value required for transmitting the user data; and a transmitter 162, configured to transmit the user data and the DMRS to a base station, so that the base station obtains a DMRS RE channel estimation value according to the received DMRS, and the base station performs interpolation filtering on the DMRS RE channel according to the DMRS RE channel estimation value to obtain channel information of the user data RE, and further the base station demodulates the user data according to the channel information of the user data RE and the user data that is transmitted by the user equipment by using the second parameter value and computed by the base station according to the compensation parameter value and an initial parameter value of the user data RE, where the user data that is transmitted by the user equipment by using the second parameter value is obtained by the base station according to the compensation parameter value and the initial parameter value of the user data RE.

Further, the compensation parameter value of the user data RE acquired by the receiver 160 is the compensation parameter value of the user data RE that is transmitted by the base station and received by the user equipment, where the compensation parameter value of the user data RE is determined by the base station according to network configuration information of the base station, where the network configuration information includes one or more of a quantity of transmit and receive antennas, a transmission order, or a channel estimation algorithm of the user equipment, and the compensation parameter value includes a power compensation value or an amplitude compensation value.

Further, the processor 161 is further configured to process the user data and the DMRS in a same precoding processing manner.

Further, the transmitter 162 is specifically configured to transmit, if the DMRS is transmitted in a physical uplink shared channel PUSCH, the processed user data and DMRS to the base station by using the PUSCH, where the DMRS is transmitted by the user equipment by using a first parameter value, the user data is transmitted by the user equipment by using the second parameter value, the first parameter value includes a first power value, and the second parameter value includes a second power value, or the first parameter value includes a first amplitude value, and the second parameter value includes a second amplitude value; and specifically further configured to transmit, if the DMRS is transmitted in a physical uplink control channel PUCCH, the processed user data and DMRS to the base station by using the PUCCH, where the DMRS is transmitted by the user equipment by using the first parameter value, the user data is transmitted by the user equipment by using the second parameter value, the first parameter value includes the first power value, and the second parameter value includes the second power value, or the first parameter value includes the first amplitude value, and the second parameter value includes the second amplitude value.

The present invention provides user equipment, mainly including a receiver, a processor, and a transmitter. A base station determines a first parameter value of a demodulation reference signal resource element DMRS RE, an initial parameter value of a user data resource element RE, and a compensation parameter value of the user data RE, and transmits the compensation parameter value to the user equipment, so that the user equipment determines, according to the compensation parameter value and a preset initial parameter value, a second parameter value required for transmitting user data, where the user data RE is used to carry the user data, the first parameter value is used to indicate that the user equipment transmits a DMRS by using the first parameter value, and the DMRS RE is used to carry the demodulation reference signal DMRS; then the base station receives the user data and DMRS that are transmitted by the user equipment, and computes, according to the compensation parameter value and the initial parameter value, the user data transmitted by the user equipment by using the second parameter value; and finally obtains a DMRS RE channel estimation value according to the received DMRS, performs interpolation filtering on the DMRS RE channel according to the DMRS RE channel estimation value to obtain channel information of the user data RE, and further demodulates the user data according to the channel information of the user data RE and the computed user data transmitted by the user equipment by using the second parameter value. In this solution, because the user equipment can receive the compensation parameter value transmitted by the base station, the base station can ensure accuracy of user data demodulated by the user equipment, a resource waste problem of user data resource elements is resolved effectively, and system power utilization is improved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal transmission method, comprising:
   determining, by a base station, a first parameter value of a user data resource element (RE), an initial parameter value of a demodulation reference signal resource element (DMRS RE), and a compensation parameter value of the DMRS RE, wherein the user data RE is used to carry user data, the first parameter value is used to indicate that the base station transmits the user data using the first parameter value, and the DMRS RE is used to carry a demodulation reference signal (DMRS); the first parameter value comprises a first amplitude value, the initial parameter value comprises an initial amplitude value, and the compensation parameter value comprises an amplitude compensation value;
   determining, by the base station according to the initial parameter value and the compensation parameter value, a second parameter value required for transmitting the DMRS; and
   transmitting, by the base station, the DMRS, the user data, and the compensation parameter value to user equipment, to enable the user equipment to compute, according to the compensation parameter value and a preset initial parameter value, the DMRS transmitted by the base station using the second parameter value, and to enable the user equipment to obtain a DMRS RE channel estimation value according to the received DMRS and the computed DMRS, and to enable the user equipment to perform interpolation filtering on the DMRS RE channel estimation value to obtain channel information of the user data RE, and further to enable the user equipment to demodulate the user data according to the channel information of the user data RE;

wherein the determining, by a base station, a first parameter value of a user data resource element (RE), an initial parameter value of a demodulation reference signal resource element (DMRS RE), and a compensation parameter value of the DMRS RE, comprises:
   determining, by the base station, the first parameter value of the user data RE, the initial parameter value of the DMRS RE, and the compensation parameter value of the DMRS RE according to network configuration information of the base station, wherein the network configuration information comprises a channel estimation algorithm of the user equipment.

2. The transmission method according to claim 1, wherein the network configuration information further comprises one or more of a quantity of transmit and receive antennas, a transmission order, the first parameter value comprises a first power value, the initial parameter value comprises an initial power value, and the compensation parameter value comprises a power compensation value.

3. The transmission method according to claim 1, wherein the transmitting, by the base station, the DMRS, the user data, and the compensation parameter value to user equipment, comprises:
   processing, by the base station, the user data and the DMRS in a same precoding processing manner; and
   transmitting, by the base station, the processed user data and DMRS to the user equipment by using a physical downlink shared channel (PDSCH) or an enhanced physical downlink control channel (EPDCCH), and transmitting the compensation parameter value of the DMRS RE to the user equipment using a physical downlink control channel (PDCCH) or a physical broadcast channel (PBCH).

4. A signal transmission method, comprising:
   acquiring, by a user equipment, a compensation parameter value of a demodulation reference signal resource element (DMRS RE), user data, and a demodulation reference signal (DMRS), wherein the DMRS RE is used to carry the demodulation reference signal (DMRS);
   computing, by the user equipment according to the compensation parameter value and a preset initial parameter value, the DMRS, wherein the second parameter value is a parameter value that is required for transmitting the DMRS and determined by the base station according to an initial parameter value of the DMRS RE and the compensation parameter value; the second parameter value comprises a second amplitude value; and the compensation parameter value comprises an amplitude compensation value;
   obtaining, by the user equipment, a DMRS RE channel estimation value according to the received DMRS and the computed DMRS transmitted by the base station using the second parameter value;
   performing, by the user equipment, interpolation filtering on the DMRS RE channel estimation value to obtain channel information of a user data resource element (RE), wherein the user data RE is used to carry the user data; and
   demodulating, by the user equipment, the user data according to the channel information of the user data RE;
   wherein the acquiring, by the user equipment, a compensation parameter value of a demodulation reference signal resource element (DMRS RE), user data, and a demodulation reference signal (DMRS), comprises:

the compensation parameter value acquired by the user equipment is the compensation parameter value of the DMRS RE that is transmitted by the base station, wherein the compensation parameter value is determined by the base station according to network configuration information of the base station, wherein the network configuration information comprises a channel estimation algorithm of the user equipment.

5. The transmission method according to claim 4, wherein the network configuration information comprises one or more of a quantity of transmit and receive antennas, a transmission order, and the compensation parameter value comprises a power compensation value;

the user data acquired by the user equipment is the user data that is transmitted by the base station using a first parameter value of the user data resource element RE, wherein the user data RE is used to carry the user data, the first parameter value is determined by the base station according to the network configuration information of the base station, the first parameter value comprises a first power value or a first amplitude value, and the network configuration information comprises one or more of the quantity of transmit and receive antennas, the transmission order, and the channel estimation algorithm of the user equipment; and the DMRS acquired by the user equipment is the DMRS that is transmitted by the base station using the second parameter value, wherein the second parameter value is the parameter value that is required for transmitting the DMRS and determined by the base station according to the initial parameter value of the DMRS RE and the compensation parameter value of the DMRS RE, and the second parameter value comprises a second power value.

6. The transmission method according to claim 5, wherein the acquiring, by the user equipment, user data and a demodulation reference signal (DMRS), comprises:

receiving, by the user equipment, the user data and the DMRS from the base station by using a physical downlink shared channel (PDSCH_ or an enhanced physical downlink control channel (EPDCCH), wherein the user data and the DMRS are transmitted by the base station after being processed in a same precoding processing manner.

7. A signal transmission method, comprising:

determining, by a base station, a first parameter value of a user data resource element (RE), an initial parameter value of a demodulation reference signal resource element (DMRS RE), and a compensation parameter value of the DMRS RE, wherein the user data RE is used to carry user data, the first parameter value is used to indicate that user equipment transmits the user data using the first parameter value, and the DMRS RE is used to carry a demodulation reference signal (DMRS); the first parameter value comprises a first amplitude value, the initial parameter value comprises an initial amplitude value, and the compensation parameter value comprises an amplitude compensation value;

transmitting, by the base station, the compensation parameter value to the user equipment, to enable the user equipment to determine, according to the compensation parameter value and a preset initial parameter value, a second parameter value required for transmitting the DMRS;

receiving, by the base station, the user data and the DMRS transmitted by the user equipment;

computing, by the base station according to the compensation parameter value and the initial parameter value, the DMRS transmitted by the user equipment using the second parameter value;

obtaining, by the base station, a DMRS RE channel estimation value according to the received DMRS and the computed DMRS;

performing, by the base station, interpolation filtering on the DMRS RE channel estimation value to obtain channel information of the user data RE; and demodulating, by the base station, the user data according to the channel information of the user data RE;

wherein the determining, by a base station, a first parameter value of a user data resource element RE, an initial parameter value of a demodulation reference signal resource element DMRS RE, and a compensation parameter value of the DMRS RE, comprises:

determining, by the base station, the first parameter value of the user data RE, the initial parameter value of the demodulation reference signal resource element (DMRS RE), and the compensation parameter value of the DMRS RE according to network configuration information of the base station; wherein the network configuration information comprises a channel estimation algorithm of the user equipment.

8. The transmission method according to claim 7, wherein the network configuration information comprises one or more of a quantity of transmit and receive antennas, a transmission order, the first parameter value comprises a first power value, the initial parameter value comprises an initial power value, and the compensation parameter value comprises a power compensation value.

9. The transmission method according to claim 8, wherein the receiving, by the base station, the user data and the DMRS transmitted by the user equipment, comprises:

if the DMRS is transmitted in a physical uplink shared channel (PUSCH), receiving, by the base station, the user data and the DMRS from the user equipment using the PUSCH, wherein the user data and the DMRS are transmitted by the user equipment after being processed in a same precoding processing manner, the DMRS is transmitted by the user equipment using the second parameter value, and the user data is transmitted by the user equipment using the first parameter value; and if the DMRS is transmitted in a physical uplink control channel (PUCCH), receiving, by the base station, the user data and the DMRS from the user equipment using the PUCCH, wherein the user data and the DMRS are transmitted by the user equipment after being processed in a same precoding processing manner, the DMRS is transmitted by the user equipment using the second parameter value, and the user data is transmitted by the user equipment using the first parameter value.

10. A signal transmission method, comprising:

acquiring, by a user equipment, a compensation parameter value of a demodulation reference signal resource element (DMRS RE), wherein the DMRS RE is used to carry a demodulation reference signal (DMRS); and the compensation parameter value comprises an amplitude compensation value;

determining, by the user equipment according to the compensation parameter value and a preset initial parameter value, a second parameter value required for transmitting the DMRS; and transmitting, by the user equipment, user data and the DMRS to a base station, to enable the base station to obtain a DMRS RE channel estimation value according to the received DMRS and the DMRS that is transmitted by the user equipment using the second parameter value and computed by the base station according to the compensation parameter value and an initial parameter value of the DMRS RE, and to enable the base station to perform interpolation filtering on the DMRS RE channel estimation value to obtain channel information of a user data resource element (RE), and further to enable the base station to demodulate the user data according to the channel information of the user data RE;

wherein the acquiring, by user equipment, a compensation parameter value of a DMRS RE, comprises:

the compensation parameter value of the DMRS RE acquired by the user equipment is the compensation parameter value of the DMRS RE that is transmitted by the base station, wherein the compensation parameter value of the DMRS RE is determined by the base station according to network configuration information of the base station, wherein the network configuration information comprises a channel estimation algorithm of the user equipment.

11. The transmission method according to claim 10, wherein the network configuration information comprises one or more of a quantity of transmit and receive antennas, a transmission order and the compensation parameter value comprises a power compensation value.

12. The transmission method according to claim 10, wherein transmitting, by the user equipment, user data and the DMRS to a base station, comprises:

processing, by the user equipment, the user data and the DMRS in a same precoding processing manner;

if the DMRS is transmitted in a physical uplink shared channel (PUSCH), transmitting, by the user equipment, the processed user data and DMRS to the base station using the PUSCH, wherein the DMRS is transmitted by the user equipment using the second parameter value, the user data is transmitted by the user equipment using the first parameter value, the first parameter value comprises a first power value, and the second parameter value comprises a second power value, or the first parameter value comprises a first amplitude value, and the second parameter value comprises a second amplitude value; and if the DMRS is transmitted in a physical uplink control channel (PUCCH), transmitting, by the user equipment, the processed user data and DMRS to the base station using the PUCCH, wherein the DMRS is transmitted by the user equipment using the second parameter value, the user data is transmitted by the user equipment using the first parameter value, the first parameter value comprises the first power value, and the second parameter value comprises the second power value, or the first parameter value comprises the first amplitude value, and the second parameter value comprises the second amplitude value.

13. A base station, comprising:

a processor, configured to determine a first parameter value of a user data resource element (RE), an initial parameter value of a demodulation reference signal resource element (DMRS RE), and a compensation parameter value of the DMRS RE, and determine, according to the initial parameter value and the compensation parameter value, a second parameter value required for transmitting a demodulation reference signal (DMRS), wherein the user data RE is used to carry user data, the first parameter value is used to indicate that the base station transmits the user data by using the first parameter value, and the DMRS RE is used to carry the DMRS; and the first parameter value comprises a first amplitude value, the initial parameter value comprises an initial amplitude value, and the compensation parameter value comprises an amplitude compensation value; and a transmitter, configured to transmit the DMRS, the user data, and the compensation parameter value to user equipment, to enable the user equipment to compute, according to the compensation parameter value and a preset initial parameter value, the DMRS transmitted by the base station using the second parameter value, and to enable the user equipment to obtain a DMRS RE channel estimation value according to the received DMRS and the computed DMRS, and to enable the user equipment to perform interpolation filtering on the DMRS RE channel estimation value to obtain channel information of the user data RE, and further to enable the user equipment to demodulate the user data according to the channel information of the user data RE;

wherein:

the processor is configured to determine the first parameter value of the user data RE, the initial parameter value of the DMRS RE, and the compensation parameter value of the DMRS RE according to network configuration information of the base station, wherein the network configuration information comprises a channel estimation algorithm of the user equipment.

14. The base station according to claim 13, wherein the network configuration information comprises one or more of a quantity of transmit and receive antennas, a transmission order the first parameter value comprises a first power value, the initial parameter value comprises an initial power value, and the compensation parameter value comprises a power compensation value.

15. The base station according to claim 13, wherein the transmitter comprises a processing module, wherein:

the processing module is configured to process the user data and the DMRS in a same precoding processing manner.

16. The base station according to claim 15, wherein the transmitter transmits the processed user data and DMRS to the user equipment using a physical downlink shared channel (PDSCH) or an enhanced physical downlink control channel (EPDCCH), and transmits the compensation parameter value of the DMRS RE to the user equipment using a physical downlink control channel (PDCCH) or a physical broadcast channel (PBCH).

17. User equipment, comprising:

a processor, configured to acquire a compensation parameter value of a demodulation reference signal resource element (DMRS RE), wherein the DMRS RE is used to carry a demodulation reference signal (DMRS); and determine, according to the compensation parameter value and a preset initial parameter value, a second parameter value required for transmitting the DMRS; and the second parameter value comprises a second amplitude value, the compensation parameter value comprises an amplitude compensation value; and a transmitter, configured to transmit user data and the DMRS to a base station, to enable the base station to obtain a DMRS RE channel estimation value according to the received DMRS and the DMRS that is transmitted by the user equipment using the second parameter value and computed by the base station according to the compensation parameter value and an initial parameter value of the DMRS RE, and to enable the base station to perform interpolation filtering on the DMRS RE channel estimation value to obtain channel information of a user data resource element (RE), and further to enable the base station to demodulate the user data according to the channel information of the user data RE;

wherein:

the compensation parameter value of the DMRS RE is the received compensation parameter value of the DMRS RE that is transmitted by the base station, wherein the compensation parameter value of the DMRS RE is determined by the base station according to network configuration information of the base station, wherein the network configuration information comprises a channel estimation algorithm of the user equipment.

18. The user equipment according to claim 17, wherein the network configuration information comprises one or more of a quantity of transmit and receive antennas, a transmission order, and the compensation parameter value comprises a power compensation value.

19. The user equipment according to claim 17, wherein the transmitter comprises a processing module, wherein: the processing module is configured to process the user data and the DMRS in a same precoding processing manner.

20. The user equipment according to claim 19, wherein:

the transmitter is configured to transmit, if the DMRS is transmitted in a physical uplink shared channel (PUSCH), the processed user data and DMRS to the base station using the PUSCH, wherein the DMRS is transmitted by the user equipment using the second parameter value, the user data is transmitted by the user equipment using the first parameter value, the first parameter value comprises a first power value, and the second parameter value comprises a second power value, or the first parameter value comprises a first amplitude value, and transmit, if the DMRS is transmitted in a physical uplink control channel (PUCCH), the processed user data and DMRS to the base station using the PUCCH, wherein the DMRS is transmitted by the user equipment using the second parameter value, the user data is transmitted by the user equipment using the first parameter value, the first parameter value comprises the first power value, and the second parameter value comprises the second power value, or the first parameter value comprises the first amplitude value.

* * * * *

UNITED STATES PATENT AND TRADEMARK OFFICE
CERTIFICATE OF CORRECTION

PATENT NO.         : 10,250,371 B2                                    Page 1 of 1
APPLICATION NO.    : 15/197170
DATED              : April 2, 2019
INVENTOR(S)        : Dageng Chen et al.

It is certified that error appears in the above-identified patent and that said Letters Patent is hereby corrected as shown below:

On the Title Page

Page 2, item (56) References Cited, U.S. PATENT DOCUMENTS should include the following reference:
-- US20150009851 A1 1/2015 Yan et al --.

Signed and Sealed this
Tenth Day of September, 2019

Andrei Iancu
*Director of the United States Patent and Trademark Office*